(12) United States Patent
Rhinefrank et al.

(10) Patent No.: US 9,587,620 B2
(45) Date of Patent: Mar. 7, 2017

(54) METHOD AND SYSTEM FOR WAVE ENERGY CONVERSION

(71) Applicant: Columbia Power Technologies, Inc., Charlottesville, VA (US)

(72) Inventors: Kenneth Edward Rhinefrank, Corvallis, OR (US); Alphonse Schacher, Corvallis, OR (US); Joseph Prudell, Corvallis, OR (US); Erik Hammagren, Corvallis, OR (US); Pukha Lenee-Bluhm, Corvallis, OR (US); Zhe Zhang, Corvallis, OR (US)

(73) Assignee: Columbia Power Technologies, Inc., Charlottesville, VA (US)

( * ) Notice: Subject to any disclaimer, the term of this patent is extended or adjusted under 35 U.S.C. 154(b) by 0 days.

(21) Appl. No.: 14/431,651

(22) PCT Filed: Sep. 30, 2013

(86) PCT No.: PCT/US2013/062579
§ 371 (c)(1),
(2) Date: Mar. 26, 2015

(87) PCT Pub. No.: WO2014/052953
PCT Pub. Date: Apr. 3, 2014

(65) Prior Publication Data
US 2015/0252777 A1   Sep. 10, 2015

Related U.S. Application Data

(60) Provisional application No. 61/707,281, filed on Sep. 28, 2012.

(51) Int. Cl.
*F03B 13/14* (2006.01)
*F03B 13/20* (2006.01)

(52) U.S. Cl.
CPC .............. *F03B 13/14* (2013.01); *F03B 13/20* (2013.01); *F05B 2270/18* (2013.01); *Y02E 10/38* (2013.01)

(58) Field of Classification Search
CPC ........... F03B 13/14; F03B 13/20; Y02E 10/38
(Continued)

(56) References Cited

U.S. PATENT DOCUMENTS

| 3,631,670 A | 1/1972 | Vassilakis |
| 4,098,084 A | 7/1978 | Cockerell |

(Continued)

FOREIGN PATENT DOCUMENTS

| GB | WO 2012076851 A1 * | 6/2012 | .......... F03B 13/1845 |
| JP | 11187609 A | 7/1999 | |

(Continued)

OTHER PUBLICATIONS

International Search Report with Written Opinion issued May 17, 2010 received in corresponding International Patent Application No. PCT/US10/00505 (3 pages).

(Continued)

*Primary Examiner* — Tulsidas C Patel
*Assistant Examiner* — Sean Gugger
(74) *Attorney, Agent, or Firm* — Pierce Atwood LLP; Kevin M. Farrell

(57) ABSTRACT

An apparatus and method for converting wave energy using the relative rotational movement between two interconnected float assemblies and the relative rotational movement between each of the float assemblies and a spar which extends from a buoyant nacelle having a central longitudinal axis wherein the floats are nestable behind the buoyant nacelle.

23 Claims, 28 Drawing Sheets

(58) Field of Classification Search
USPC .......................................... 290/42, 43, 53, 54
See application file for complete search history.

(56) References Cited

U.S. PATENT DOCUMENTS

| | | | |
|---|---|---|---|
| 4,118,932 A | 10/1978 | Sivill | |
| 4,170,898 A | 10/1979 | Salter | |
| 4,179,886 A | 12/1979 | Tsubota | |
| 4,319,454 A | 3/1982 | Lucia | |
| 4,389,843 A | 6/1983 | Lamberti | |
| 4,408,455 A | 10/1983 | Montgomery | |
| 4,608,497 A | 8/1986 | Boyce | |
| 4,718,231 A | 1/1988 | Vides | |
| 4,781,023 A | 11/1988 | Gordon | |
| 5,066,867 A | 11/1991 | Shim | |
| 5,132,550 A | 7/1992 | McCabe | |
| 5,808,368 A | 9/1998 | Brown | |
| 6,109,029 A | 8/2000 | Vowles et al. | |
| 6,269,636 B1 | 8/2001 | Hatzilakos | |
| 7,315,092 B2 | 1/2008 | Cook | |
| 7,444,810 B2 | 11/2008 | Olson | |
| 7,877,994 B2 | 2/2011 | Bull et al. | |
| 8,011,893 B2 | 9/2011 | Stiesdal | |
| 2006/0208494 A1 | 9/2006 | Cook | |
| 2007/0266704 A1 | 11/2007 | Bull et al. | |
| 2008/0088134 A1* | 4/2008 | Montgomery | F03B 13/1865 290/53 |
| 2008/0169653 A1 | 7/2008 | Olson | |
| 2009/0091135 A1* | 4/2009 | Janca | F03B 13/10 290/54 |
| 2009/0129931 A1* | 5/2009 | Stiesdal | F03D 11/00 416/204 R |
| 2010/0007225 A1 | 1/2010 | Platon et al. | |
| 2010/0140944 A1 | 6/2010 | Gardiner et al. | |
| 2010/0213710 A1* | 8/2010 | Rhinefrank | F03B 13/20 290/42 |
| 2011/0036938 A1* | 2/2011 | Blomeley | B64C 3/56 244/2 |
| 2013/0334816 A1* | 12/2013 | Houis | F03B 13/14 290/42 |

FOREIGN PATENT DOCUMENTS

| | | | | |
|---|---|---|---|---|
| JP | 2006226274 A | | 8/2006 | |
| WO | 9928622 | | 6/1999 | |
| WO | 2008014584 A1 | | 2/2008 | |
| WO | 2008063086 A2 | | 5/2008 | |
| WO | 2010011370 A1 | | 1/2010 | |
| WO | 2012076851 A1 | | 6/2012 | |
| WO | 2012106558 A2 | | 8/2012 | |
| WO | WO 2012106558 A2 * | | 8/2012 | F03B 13/20 |

OTHER PUBLICATIONS

Extended European Search Report issued Mar. 8, 2013 received in corresponding European Patent Application No. 10744077.8 (7 pages).

Shrestha, et al. "Direct Drive Wind Turbine Generator with Magnetic Bearing", Proceedings of the European Offshore Wind Conference and Exhibition, Dec. 4-6, 2007, Berlin, Germany [retrieved from the internet May 4, 2010], URL ,http://www.eow2007proceedings.info/allfiles2/194_Eow2007fullpaper.pdf>.

* cited by examiner

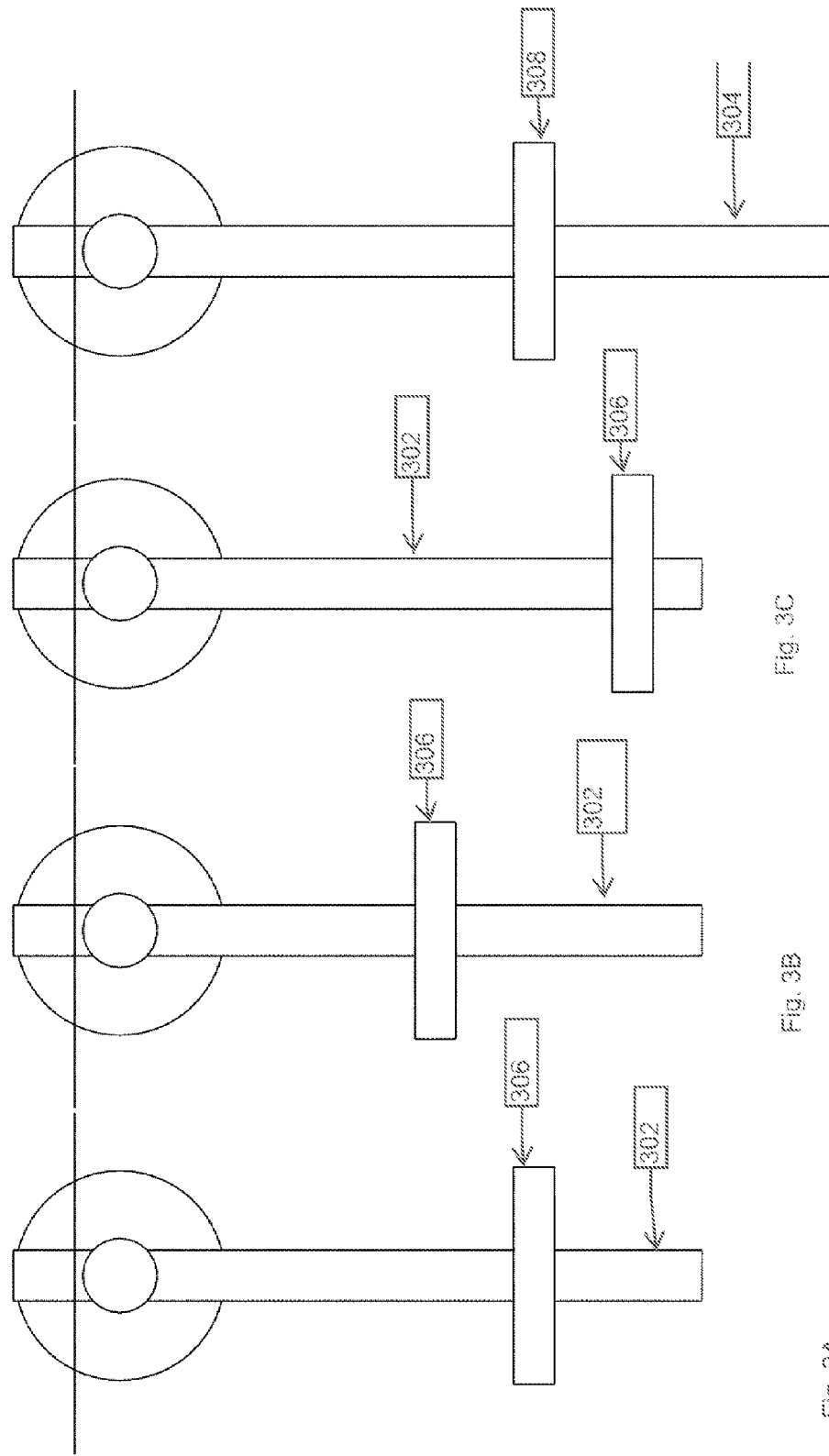

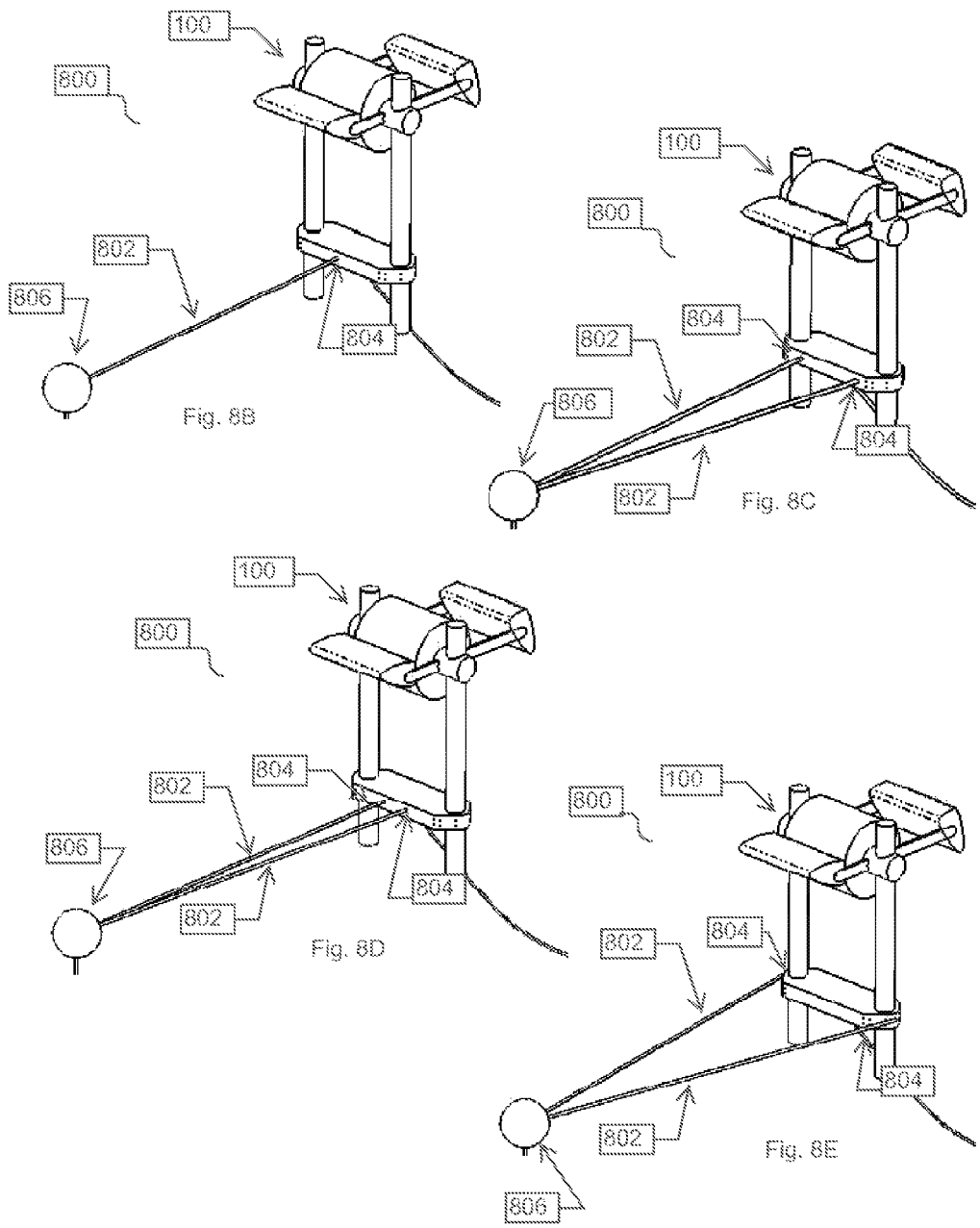

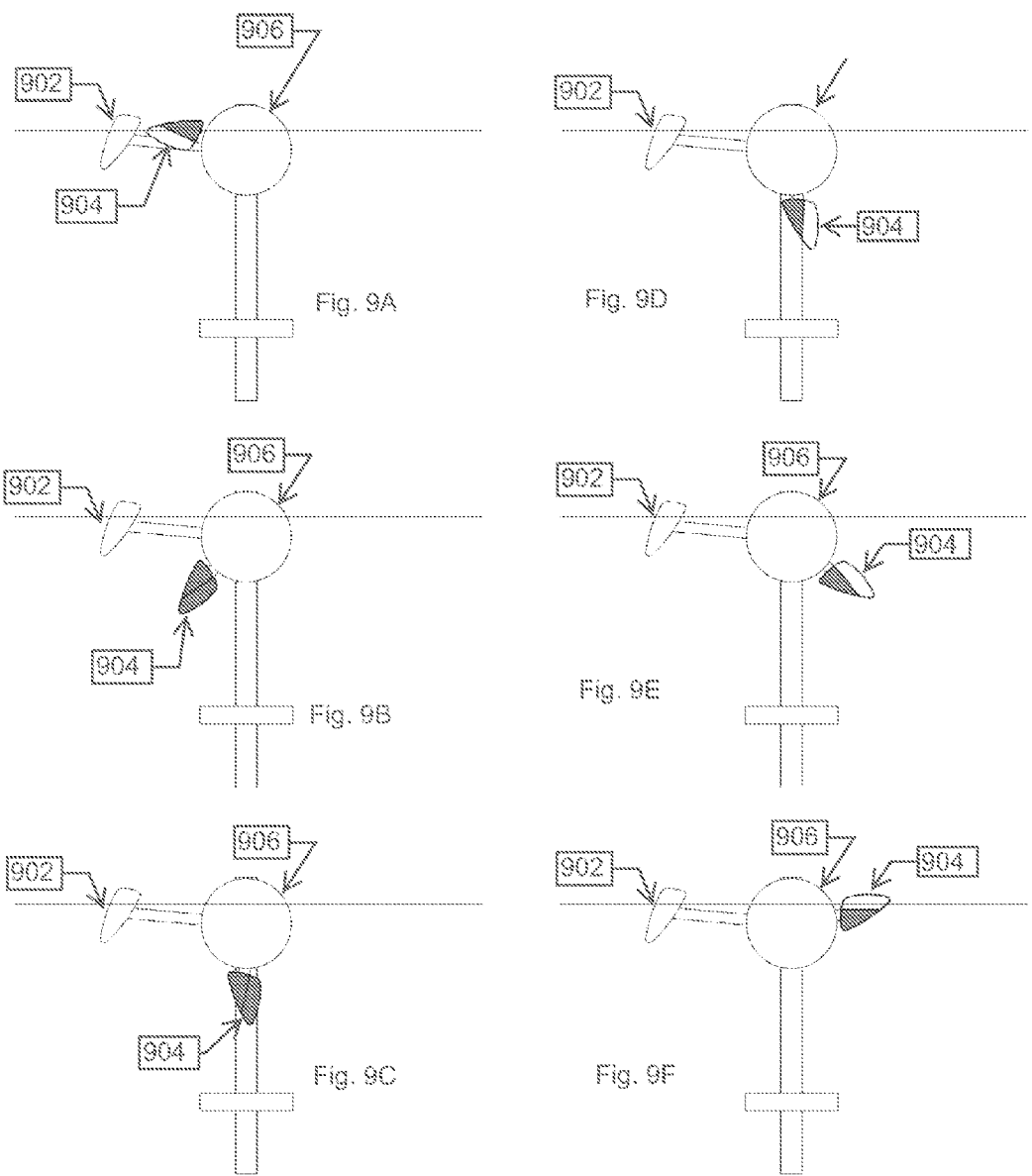

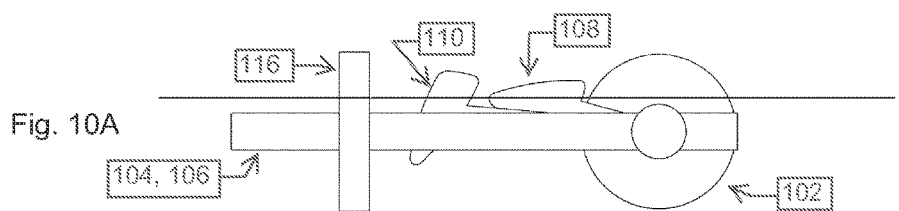
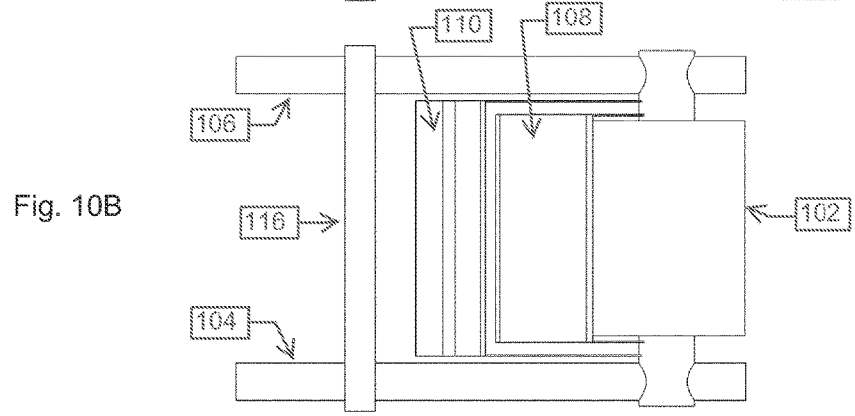
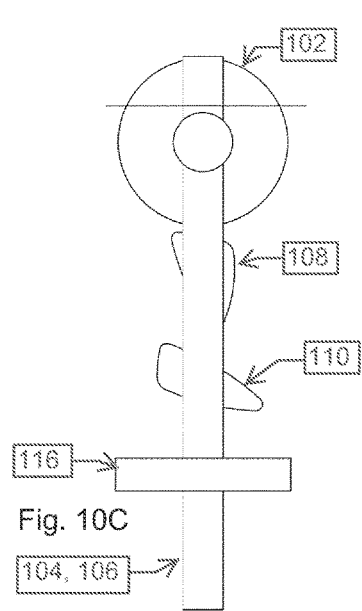
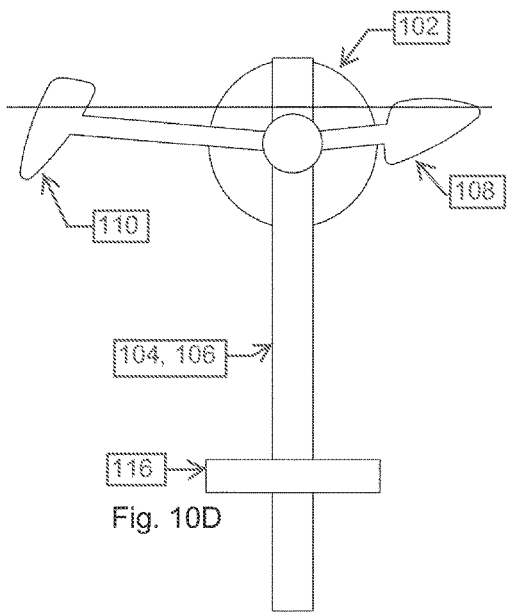
Fig. 10A
Fig. 10B
Fig. 10C
Fig. 10D

SIDE VIEW

TOP VIEW

BOTTOM VIEW

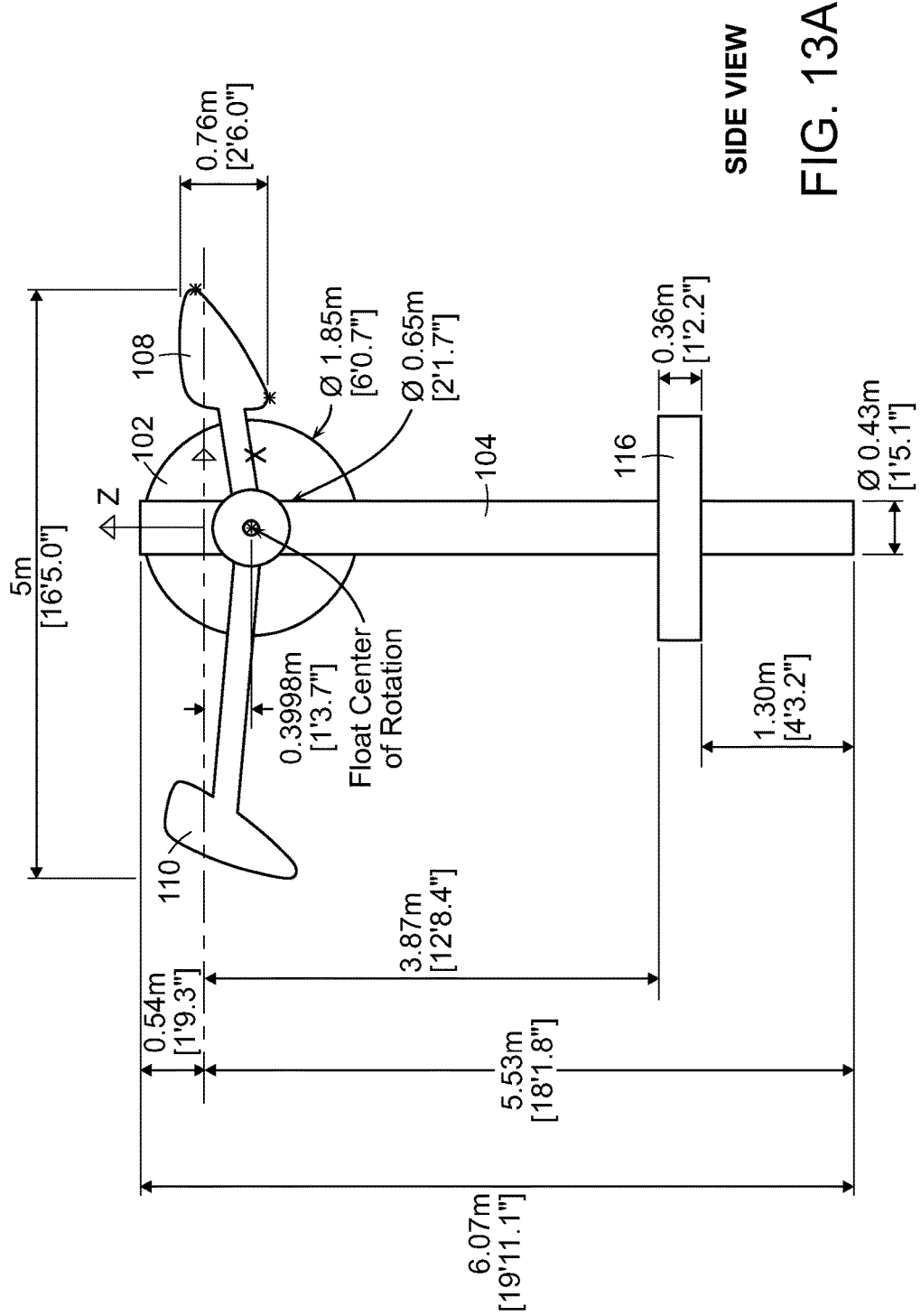
FIG. 13A SIDE VIEW

TOP VIEW

BOTTOM VIEW

SIDE VIEW

TOP VIEW

BOTTOM VIEW

SIDE VIEW

TOP VIEW

BOTTOM VIEW

METHOD AND SYSTEM FOR WAVE ENERGY CONVERSION

BACKGROUND

1. Field of the Invention

The present invention relates generally to converting wave surge and heave into energy and more particularly to wave energy conversion (WEC) devices, systems, and methods.

2. Discussion of Background Information

Ocean energy, and wave energy in particular, represents a consistent, reliable and predictable energy resource that is widely-available, close to population centers and load-matched. Approximately seventy percent (70%) of the population of the entire world lives within two hundred miles of an ocean, making that an accessible source of renewable energy. Environmentally, waves also represent one of the most benign sources of clean renewable energy. This set of characteristics is unique to wave energy amongst the most widely-available, global renewable energy resources.

The International Energy Agency has declared a 2030 goal for wave, tidal and other marine energy sources of the creation of 160,000 direct jobs and a savings of 5.2 billion tons of $CO_2$ emissions. For the U.S. specifically, the electricity practically available from wave power is about 252 TWh/yr or approximately 6.5% of US electricity demand.

Wave energy is a globally-desirable resource and has the potential to be a cost-competitive and important component of a diverse mix of clean, renewable energy resources. However, no company has yet been able to cost-effectively demonstrate use of the oceans' slow speeds and massive hydrodynamic forces. This problem stems from a variety of considerations, including that existing wave energy conversion devices typically lack adequate protection mechanisms from extreme conditions, suffer from relative mechanical unreliability, and fail to fully capture the rotational energy of a wave. Solving the conflicting problems of survivability and cost of energy is achievable, yet success in doing so requires a significant improvement over the state-of-the-art (STOA).

A need therefore exists for a wave energy conversion apparatus that efficiently and cost-effectively converts the rotational ocean wave energy into rotary motion for use in direct drive rotary generation while achieving improved reliability and survivability.

SUMMARY OF THE INVENTION

The present disclosure describes a wave energy converter (WEC) for use in range of autonomous and grid-connected applications, including but not limited to low-power sensors, marine vehicles and vessels, desalination, aquaculture, offshore oil & gas platforms, and utility-scale grid connection. The WEC is a floating, self-referenced multi-body system having at least two floats, two spars extending downward, and at least one nacelle buoyantly supportable on a surface of a body of water that effectively and efficiently converts the heave and surge of offshore swells and storm waves into rotational torque that may drive both conventional and large-diameter slow-speed direct-drive generators or pumps.

The WEC does not rely on a mooring system to produce torque, but may include a mooring system for station-keeping and, in some embodiments, for directional control. In certain autonomous applications the WEC may not require a mooring at all. WECs in accordance with the present disclosure may take advantage of the rotational nature of ocean waves to capture the incident energy with floats that are rotationally coupled to produce mechanical torque in the central housing. This approach is both more efficient and better able to handle the extreme range of power found in the ocean. Such an approach may also result in safe operation over the full spectrum of weather conditions and is thus survivable in even "hundred-year storm" conditions The ultimate aim of a wave energy conversion device (WEC) is to convert one form of energy into another; in this case, in a chain including hydrodynamic conversion to mechanical torque and ultimately to electrical or other readily transportable forms. Due to the nature of the energy resource, WEC's necessitate a unique set of design requirements including: extremely low speed; extremely high force; cyclic, abrupt and chaotic motion; and peak speeds and forces that are over 10× the annual average. The extremely low speeds can be utilized to achieve a design advantage that provides a cost-effective, combined electro-mechanical solution; one that cannot be realized with conventional approaches that normally operate at 10× higher speeds. This results in lower electromagnetic hardware costs, improved efficiency, increased energy output and lower cost of energy (CoE).

The wind industry has demonstrated that large-diameter direct-drive is a viable technical approach at slow speeds, and the WEC can do so as well with adjustment for the challenges presented by taking power off at extremely low speeds. Therefore, various embodiments may utilize direct drive, thereby eliminating the need for a gearbox, improving reliability, and reducing the need for expensive marine maintenance operations. In addition, the stator/rotor components may, in some embodiments, be modular, further facilitating lower pre-deployment transportation costs due to smaller overall dimensions. Modularity may also allow for "at sea" maintenance and fault tolerance.

In one aspect, a system and apparatus for a wave energy converter (WEC) is provided comprising a buoyant nacelle having a central longitudinal axis. The WEC further comprises a first spar and a second spar, each mated to the buoyant nacelle. A first float may be operatively coupled to a first power take off and be positioned to rotate about the central longitudinal axis within a radial span bounded by an outer surface of the nacelle and a radially distal end of the first float and a second float may be operatively connected to a second power take off or the first power take off positioned to rotate about the longitudinal axis within a radial span bounded by a radially distal end of the first float and a radially distal end of the second float.

In another aspect, a method for generating power is provided comprising a first step of providing a WEC comprising a buoyant nacelle having a central longitudinal axis, a first spar and a second spar, each mated to the buoyant nacelle, a first float, and a second float. The First float may be operatively coupled to a first power take off and positioned to rotate about the central longitudinal axis within a radial span bounded by an outer surface of the nacelle and a radially distal end of the first float, and the second float may be operatively connected to a second power take off or the first power take off and positioned to rotate about the longitudinal axis within a radial span bounded by a radially distal end of the first float and a radially distal end of the second float. The method for generating power also comprises a second step of deploying the WEC in a wave field.

BRIEF DESCRIPTION OF THE DRAWINGS

One will better understand these and other features, aspects, and advantages of the present invention following a review of the description, appended claims, and accompanying drawings in which:

FIGS. 3A-D are side views illustrating WECs having hydrodynamic control systems positioned at various depths along spars of various lengths in accordance with various embodiments of the present invention.

FIGS. 8A-F are illustrations of various mooring systems attached to WECs in accordance with various embodiments of the present invention.

FIGS. 9A-F are side views illustrating an overtopped float correction in accordance with various embodiments of the present invention.

FIGS. 10A-D are top and side views of nested and/or deployed WECs in accordance with various embodiments of the present invention FIG. 11 provides side views illustrating the length and depth of four exemplary WECs in accordance with various embodiments of the present invention.

FIGS. 13A-C are dimensional schematics of a moderate-scale WEC in accordance with various embodiments of the present invention.

DETAILED DESCRIPTION

Figure 1A:
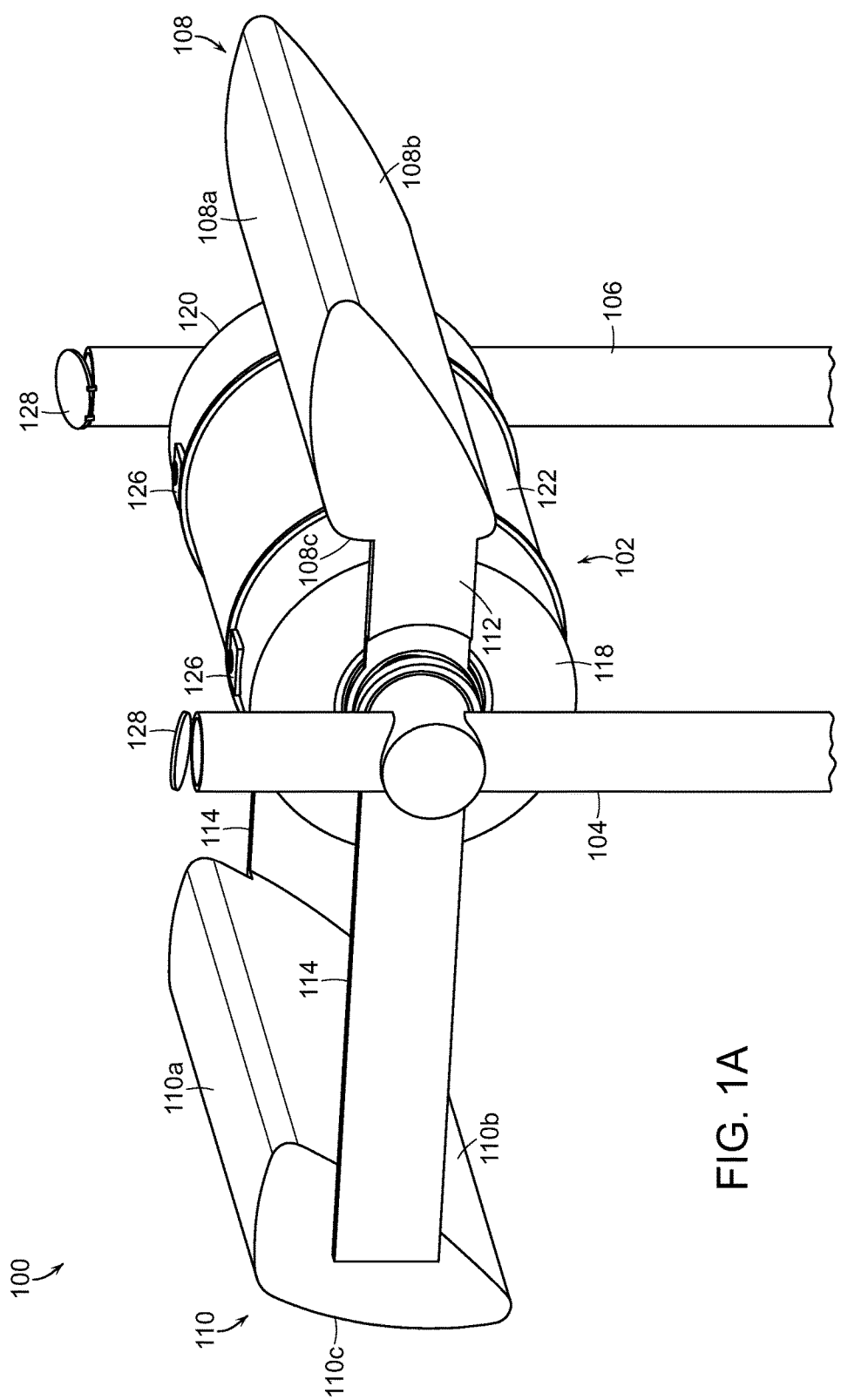
FIGS. 1A-E are 3D isometric, external views illustrating a WEC in accordance with various embodiments of the present invention.
Figure 1B:
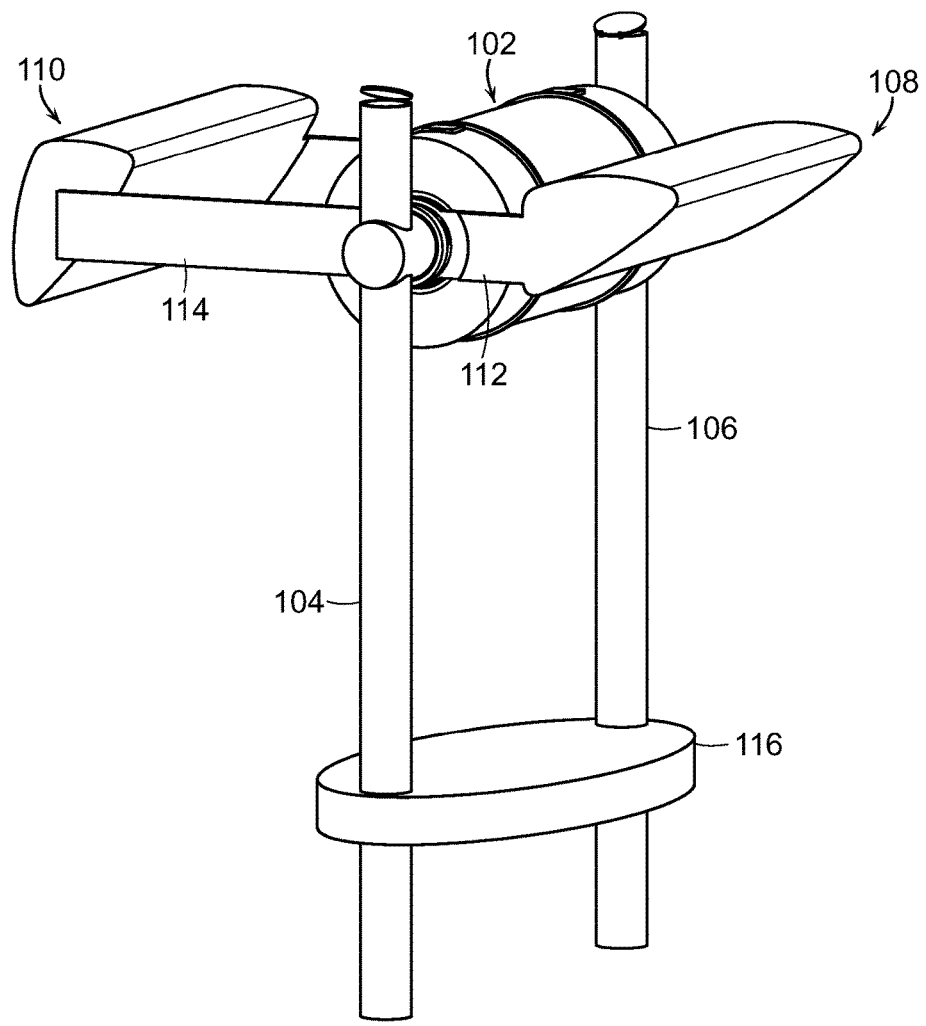
Figure 1C:
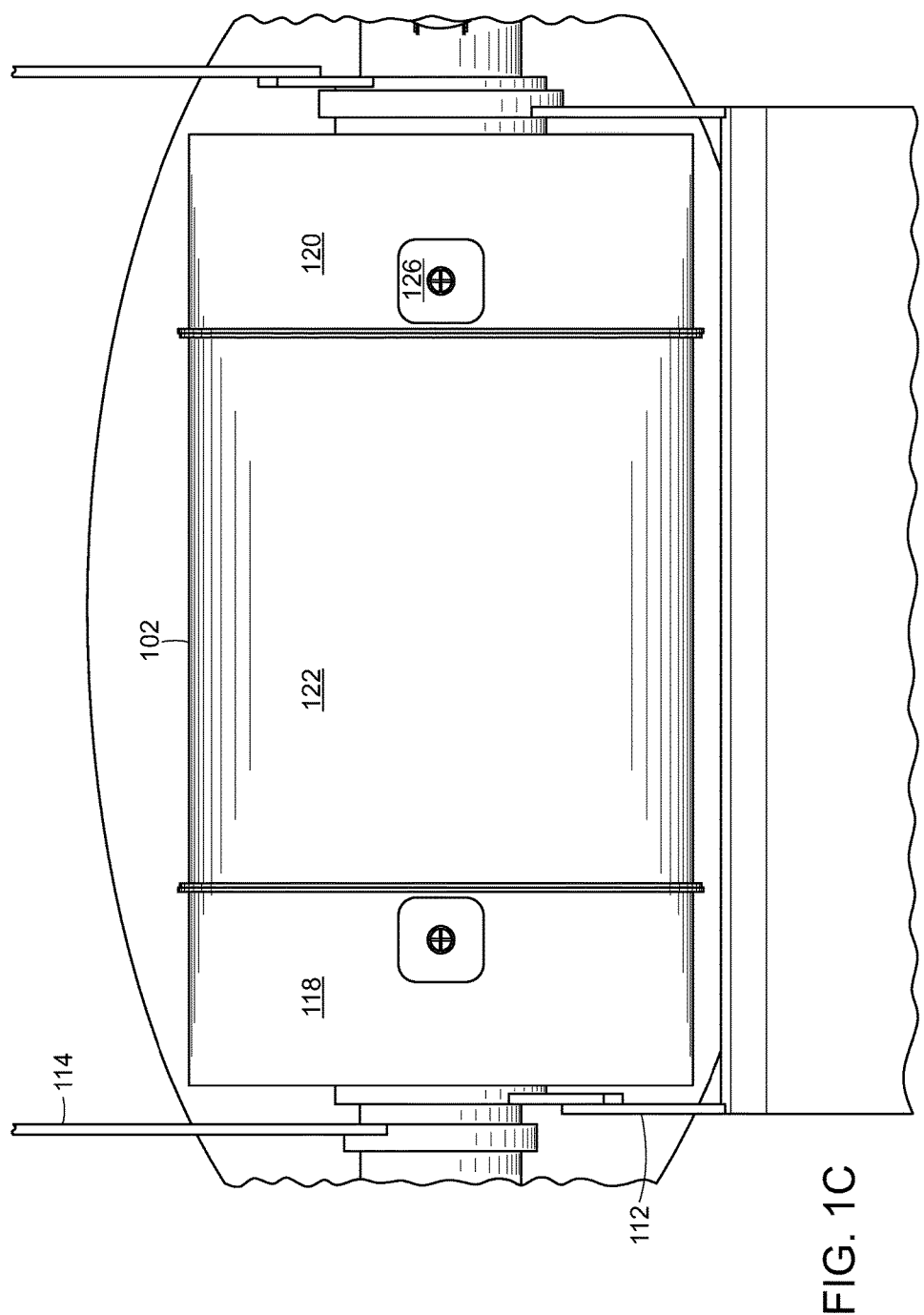
Figure 1D:
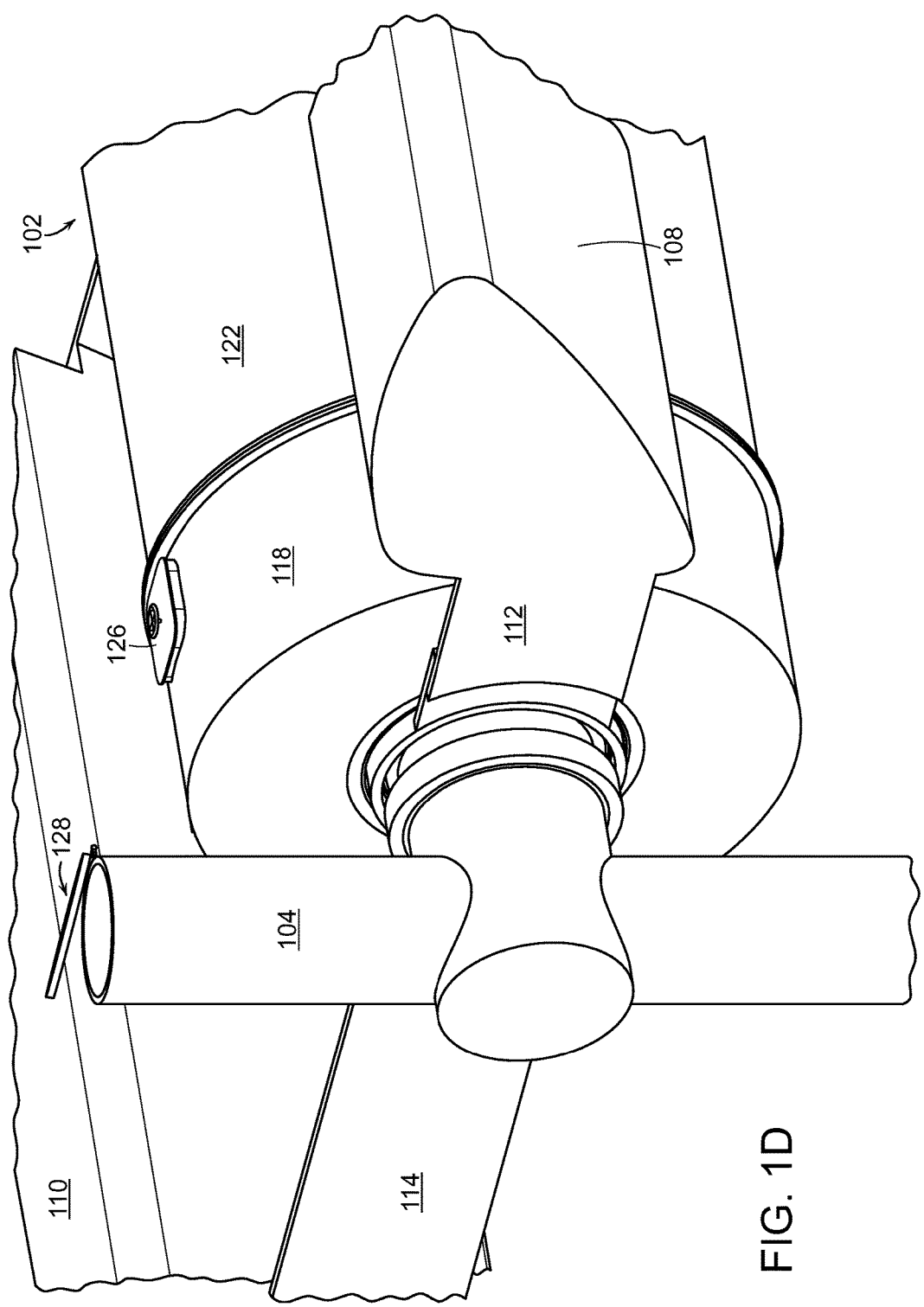
Figure 1E:
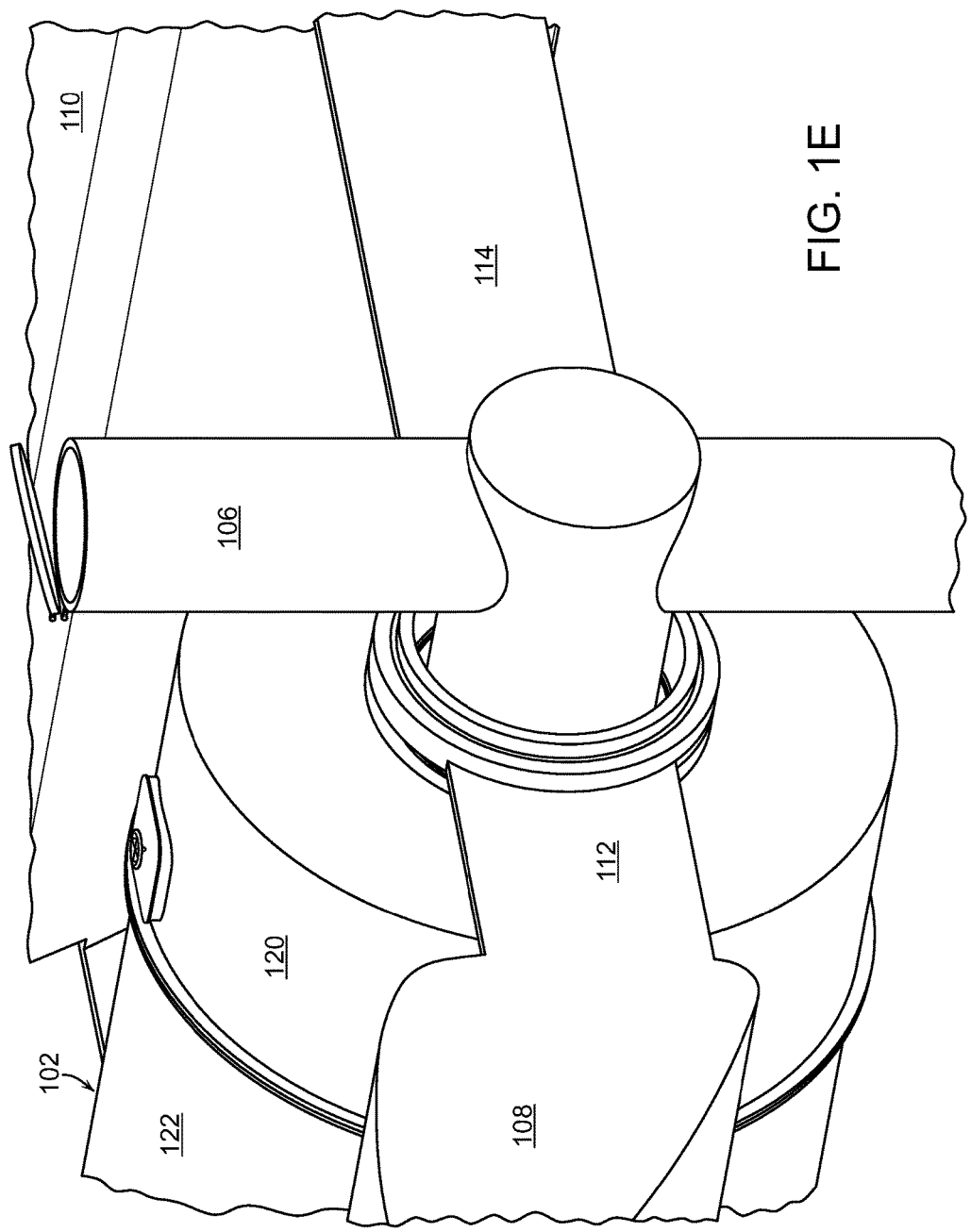

The technology of the present disclosure relates to a wave energy converter (WEC) useful for transforming the energy associated with the heave and surge of offshore swells and storm waves into rotational power. Turning now to FIGS. 1A-G, the WEC 100 comprises a buoyant nacelle 102 having a central longitudinal axis, a first spar 104, a second spar 106, a first float 108 operatively coupled (e.g., by first float drive arms 112) to a power take off (PTO) and a second float 110 operatively coupled (e.g., by second float drive arms 114) to a power take off (e.g., the first power take off or a second power take off). In some embodiments the WEC 100 may also include a hydrodynamic control system 116 (HCS).

In some embodiments, the nacelle 102 may be described as a substantially watertight housing within which may be housed one or more rotary-driven power take offs. In other embodiments the nacelle may be described as two or more (e.g., three as shown) connected, substantially watertight modules 118, 120, 122. In some such embodiments, a center module 122 may be an empty buoyant shell, which may contain power generation, maintenance, and/or other equipment, or may be used for any other suitable purpose. In further such embodiments, a first module 118 and a second module 120 each houses one or more rotary-driven power take offs.

Modularization and/or compartmentalization of any WEC 100 component (e.g., spars 104, 106, floats 108, 110, nacelle 102, etc.) may be desirable in many embodiments. Compartmentalization may, for example, provide a mechanism to contain potential leaks, such that, in the event of a leak, any flooding is contained to a limited area of the WEC 100. Compartmentalization also provides various discreet areas for more useful equipment storage spaces, more accessible maintenance areas, to serve as dynamic ballasting tanks, etc. Modularization of any particular WEC 100 component may provide the additional benefits of reduced size during transport and/or simplifying at-sea maintenance, each of which reduces costs and operational downtime.

The nacelle 102 may be produced from composite material (e.g., carbon fiber, Kevlar, fiberglass, etc.), concrete, rolled steel, aluminum, and/or any other suitable metal or alloy. In some embodiments, any of the nacelle 102 or modules thereof 118, 120, 122 may include nacelle access hatches 126 for loading/offloading equipment and personnel (e.g., for maintenance and repairs). As discussed in more detail below with reference to FIGS. 2A-B, buoyant floats 108 and 110 are operatively coupled to the one or more PTOs mounted within the nacelle 102. The operative coupling may, in some embodiments, comprise drive arms 112, 114 connected to, for example, a drive shaft/hub extending into the nacelle 102 or a gearbox connected to such a drive shaft/hub. A drive shaft/hub according to some embodiments may in turn be connected to, for example, one or more direct drive generator(s), gearbox drive generator(s), hydraulic system(s), pumping system(s), water pump(s), water desalinator(s), pneumatic pump(s), hydraulic pump(s), etc. However, it will be understood that, in view of this disclosure, one skilled in the art may readily design alternatives to the above for transferring rotary power to a PTO mounted within a nacelle and that these embodiments are within the scope of this disclosure.

Other structural elements of a WEC 100 in accordance with the present disclosure may include a first spar 104 and a second spar 106. A spar (e.g., 104, 106), as that term is used herein, comprises a hollow or solid elongate element. A cross-sectional shape of each spar 104, 106 may be any suitable shape (e.g., circular, triangular, airfoil shaped, elliptical, etc.). The spars 104, 106 may be produced from composite material (e.g., carbon fiber, Kevlar, fiberglass, etc.), concrete, rolled steel, aluminum, and/or any other suitable metal or alloy. Depending on scale, one or more of the spars 104, 106 may be hollow, compartmentalized, or modularized to house or provide ingress/egress for ballast, equipment, and personnel associated with power generation, maintenance, ballasting etc. When deployed, the first spar 104 and second spar 106 extend downward into a body of water. The spars 104, 106 may generally be attached, directly or indirectly, to opposing ends of the nacelle 102. In some embodiments, the spars 104, 106 may be fixedly or rotatably attached to the nacelle 102, however, it will be clear in view of this disclosure that any suitable method of attachment may be used.

In some embodiments one or more of the spars 104, 106 can extend upward from the nacelle to operate as a mooring mast or accessory (e.g., antenna, solar panel, warning light, etc.) mounting structure. Various embodiments may include boarding areas (e.g., service platforms and/or docking fixtures) attached to one or more of the spars 104, 106, providing for improved service access for deployed WECs 100. For larger designs, including utility scale designs, a spar access hatch 128 may be provided in the upper region of an extended spar. Spar access hatches 128 will generally be above water line in non-storm conditions and designed such that maintenance personnel and/or equipment can enter/exit the WEC 100 to gain further access to the components and interior equipment of the WEC 100.

The spars 104, 106 provide structural support to the WEC 100 and provide a design tool for setting a center of gravity (CG) and/or center of buoyancy (CB) of the WEC 100. The CG and/or CB design point can be achieved by tailoring spar length (draft), spar weight, and/or spar weight distribution to particular applications. Additionally, the spars 104, 106 serve as a point of attachment for one or more hydrodynamic control systems 116 (e.g., a weight, plate, or ballast tank).

In some embodiments, a HCS 116 may be fixedly attached to the spars 104, 106. In other embodiments, as further described below with reference to FIGS. 3A-D, the HCS 116 may be movably mounted to the spars 104, 106 such that the position of the HCS 116 along the spars 104, 106 can be varied. It may be desirable to adjust the position of the HCS 116 for any number of reasons, including but not limited to, variation in sea states, variation in weather, and/or changes to mission requirements. HCSs 116 may include, but are not limited to, plates (e.g., heave plates, damper plates), shaped members (e.g., wedges, cylinders, cubes, ellipses, etc.), ballast tanks, hydrodynamic (e.g., airfoil shaped) plates and/or ballast tanks, etc. HCSs may be produced from composite material (e.g., carbon fiber, Kevlar, fiberglass, etc.), concrete, rolled steel, aluminum, and/or any other suitable material. In some embodiments, such HCSs 116 may include additional features (not shown) such as, for example, dynamic ballast controls, vanes/rudders, trim tabs, mooring system attachments, or any other desired additional feature. It will be apparent in view of this disclosure that any WEC 100 component (e.g., spars 104, 106, floats 108, 110, nacelle 102, etc.), or a combination of such components, may, in various embodiments, include one or more of the features as described above with reference to an HCS 116. It will be further apparent in view of this disclosure that, in some embodiments, any such features or combination of such features may be attached to the WEC 100 directly or as part of an external module/compartment rather than being included as part of any particular component of the WEC 100.

While depicted as a single HCS 116 being attached to two spars 104, 106, it will be apparent in view of this disclosure that any number of HCSs 116 may be directly or indirectly attached by any means to any component, or combination of components, of the WEC 100 (e.g., floats 108, 110, drive arms 112, 114, nacelle 102, etc.). For example, some embodiments may have two independently movable HCSs 116, each mounted to one spar (e.g., 104 or 106). In other embodiments, a HCS may be indirectly attached to the spars 104, 106 via a flexible member (e.g., cable, rope, chain, or any other tethering device).

An important feature of various WECs 100 in accordance with the present disclosure may be the arrangement of the two or more floats 108, 110. More specifically, unlike prior art embodiments, the present disclosure relates to a WEC 100 having a first float 108 and a second float 110, each designed to rotate about a central longitudinal axis of the nacelle 102. In various embodiments the first float 108 and the first float drive arms 112 are designed to rotate outside the nacelle 102 within a radial span region defined by the second float 110 and the second float drive arms 114. Accordingly, in such embodiments, the float arrangement design allows both the first float 108 and the second float 110 to achieve uninhibited, 360-degree rotation about the central longitudinal axis. The advantages associated with this design with regard, for example, to efficiency and survivability will be discussed in greater detail below with reference to FIGS. 14A-F.

Figure 1F:
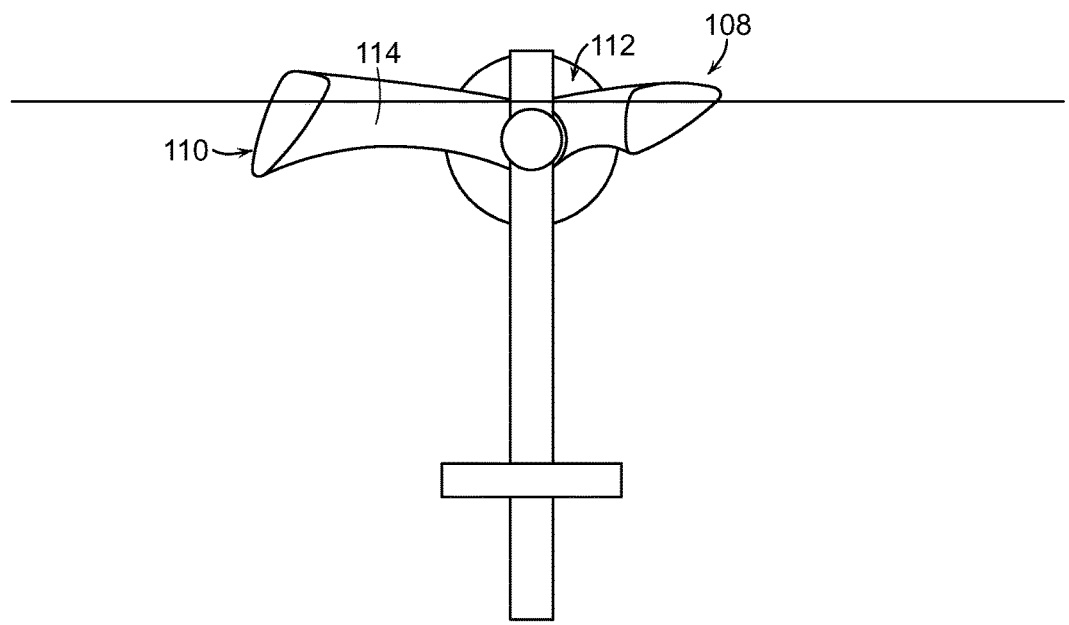
FIGS. 1F-G are side views illustrating arched drive arms in accordance with various embodiments of the present invention.
Figure 1G:
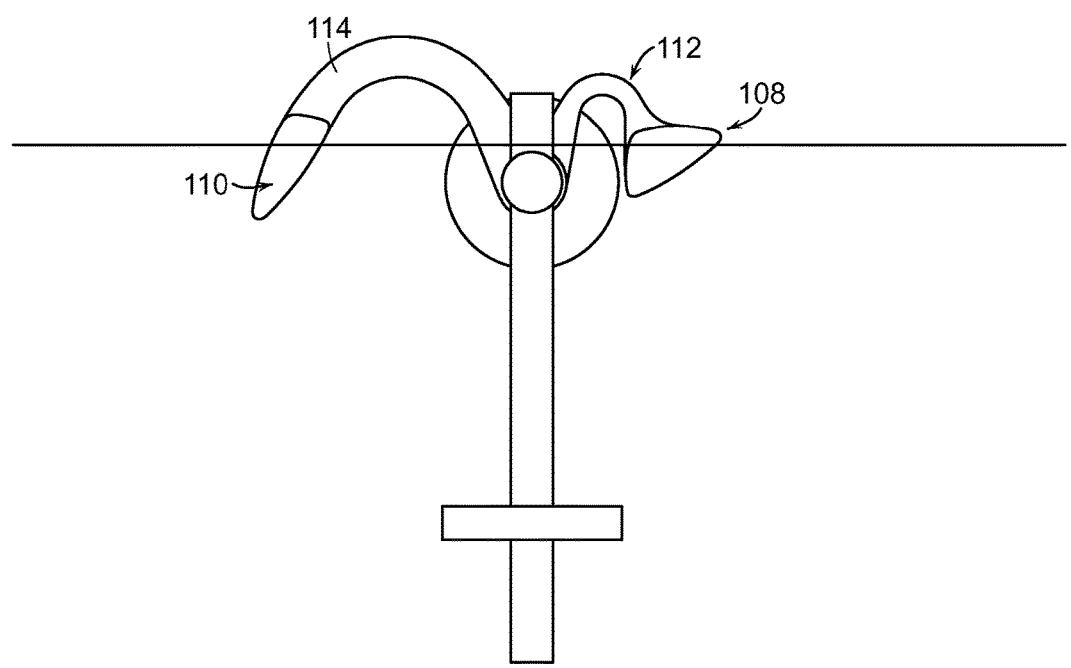

It will be apparent in view of this disclosure that the arrangement depicted in FIGS. 1A-G of the floats 108, 110 and drive arms 112, 114 being positioned within the spars 104, 106 is not exclusive. In various embodiments the floats 108, 110 may each be wider than, and connect to the PTO(s) outside of, the spars 104, 106. In some such embodiments, the drive arms 112, 114 may be longer than the spars such that each float 108, 110 retains uninhibited, 360-degree rotation about the central longitudinal axis. In further embodiments the first float 108 and first float drive arms 112 may be positioned within the spars 104, 106 as depicted in FIGS. 1A-G while the second float 110 and second float drive arms 114 are positioned outside of the spars 104, 106 as described above. The term drive arms (e.g., 112, 114) as described herein includes float connecting arms directly and operatively connected to a drive shaft/hub, but may also include float connecting arms designed to idle about a shaft or structural member as described in greater detail below with reference to FIGS. 2A-B. As shown in FIGS. 1F-G, the drive arms 112, 114 need not be straight, but may, in some embodiments, be curved or arched. However, it will be understood that drive arms 112, 114 in accordance with the present disclosure may have any shape and/or cross-section.

It will be further apparent in view of this disclosure that the "nested" arrangement of the first float 108 and second float 110 and their respective drive arms 112, 114 can be extended to designs comprising more than two floats rotating about, and operatively connected to a single nacelle (e.g., two floats positioned within the spars as depicted in FIGS. 1A-G and additional floats positioned outside the spars as described above). Similarly, one skilled in the art could readily make and use a wave energy converter comprising an array of connected wave energy converters (e.g., having a spar-nacelle-spar-nacelle-spar arrangement with nested float pairs attached to each nacelle). Such array embodiments may facilitate mooring, construction cost, and maintenance efficiencies by reducing the number of spars required per nacelle, sharing mooring systems, and reducing the number of generation sites to be maintained.

The floats 108, 110 may be produced from composite material (e.g., carbon fiber, Kevlar, fiberglass, etc.), rolled steel, aluminum, any other metal or alloy, wood, foam, rubber, concrete, and/or any other suitable material. Floats of any size, shape, volume, buoyancy, weight, and/or orientation may be used in accordance with the present disclosure. In various embodiments one or more of the floats 108, 110 may be designed to have one or more internal ballast tanks (not shown). In some such embodiments, the internal ballast tanks may be dynamic ballast tanks, adjustable for tuning purposes, damage prevention, maintenance, towing, overtopping correction, or any other circumstance that may require repositioning, buoyancy corrections, or other adjustments to the floats 108, 110.

In some preferred embodiments, each float may be designed to optimize cost-effective energy capture. In various embodiments the first float 108 may have an upper side 108*a*, a forward side 108*b*, and an aft side 108*c*. The upper side 108*a* and aft side 108*c* of the first float 108 may be designed to minimize materials (i.e., reduce costs) used to enclose the structure. For example; a semicircular upper side 108*a* requires more material and increases costs of production. All sides (e.g., 108*a-c*) of first float 108 may be flat or concave, but in some preferred embodiments may be slightly convex. Such slightly convex curvature allows for composite manufacture on a wound mandrel as well as mold-based composite manufacture processes.

The forward side 108*b* may, in some embodiments, be optimized in both radius and slope in order to maximize energy capture from the incident wave climate. Such optimization may be achieved using hydrodynamic numerical analysis and optimization techniques to design the float to maximize power delivered by the first float 108 while minimizing the material utilized. In such embodiments the optimized shape (slope and radius) is the result of an optimized power to cost ratio. It will be apparent in view of this disclosure that particular float geometries, dimensions, and orientations will vary depending on the particular size, power requirements, and expected operating conditions of each individual WEC 100. In a plan view perspective, the forward side 108*b* of the first float 108 is rectangularly shaped to maximize exposed surface area, thereby increasing energy capture. Additionally, the top side float volume, or freeboard, is optimized to the minimal necessary volume (i.e., reduced freeboard) to allow sufficient driving force while eliminating excess reserve buoyancy to improve survivability. This contributes to a continued operation of the WEC 100 in all wave conditions (including storm waves) by removing excess force that would otherwise be created by excess freeboard.

The second float 110 may also be of any size, shape, volume, buoyancy, weight, and/or orientation in accordance with the present disclosure. In some preferred embodiments, each float may be designed to optimize cost-effective energy capture. In various embodiments the second float 110 may have an upper side 110*a*, a forward side 110*b*, and an aft side 110*c*. The second float 110 is designed in some embodiments to have a deeper draft than the first float 108. The draft may be chosen to be any depth, but in some embodiments may be optimized to maximize a surface area which is in contact with the wave and/or optimized to maximize the combined effects of wind, waves, and currents. Maximizing contact surface area may increase energy capture when the wave force acts against the second float 110. The upper side 110*a* and aft side 110*c* of the second float 110 may be designed to minimize materials (i.e., reduce costs) used to enclose the structure. For example; a semicircular upper side 110*a* requires more material and increases costs of production. All sides (e.g., 110*a-c*) of second float 110 may be flat or concave, but in some preferred embodiments may be slightly convex. Such slightly convex curvature allows for composite manufacture on a wound mandrel as well as mold-based composite manufacture processes.

The forward side 110*b* may, in some embodiments, be optimized in both radius and slope in order to maximize energy capture from the incident wave climate. Such optimization may be achieved using hydrodynamic numerical analysis and optimization techniques to design the float to maximize power delivered by the second float 110 while minimizing the material utilized. In such embodiments the optimized shape (slope and radius) is the result of an optimized power to cost ratio. It will be apparent in view of this disclosure that particular float geometries, dimensions, and orientations will vary depending on the particular size, power requirements, and expected operating conditions of each individual WEC 100. In a plan view perspective, the forward side 110*b* of the second float 110 is rectangularly shaped to maximize exposed surface area, thereby increasing energy capture, and optimized to maximize the combined effects of wind, waves, and currents. Additionally, the top side float volume, or freeboard, is optimized to the minimal necessary volume (i.e., reduced freeboard) to allow sufficient driving force while eliminating excess reserve buoyancy to improve survivability. This contributes to a continued operation of the WEC 100 in all wave conditions (including storm waves) by removing excess force that would otherwise be created by excess freeboard.

In various embodiments, the optimized shape of the second float 110 is similar in outer contour to that of the first float 108. In some such embodiments, this similarity allows for both the first float 108 and second float 110 to be made from the same mold and manufacturing process, thereby eliminating the need for multiple sets of manufacturing equipment and further reducing manufacturing costs. To utilize a first float 108 as a second float 110, the first float 108 may be flipped from port to starboard and rotated toward the bottom. This allows for both forward sides 108*a* and 110*a* to achieve optimized wave energy capture, the aft float to have a deeper draft, and enables cost reductions by making both floats from a single mold.

As described above, the floats 108, 110 are operatively connected to PTOs mounted within the nacelle 102. Such PTOs may, in some embodiments, comprise one or more direct drive generator(s), gearbox drive generator(s), hydraulic system(s), pumping system(s), water pump(s), water desalinator(s), pneumatic pump(s), hydraulic pump(s), etc. For various pump and hydraulic-related embodiments, the drive shaft/hub may be directly or indirectly connected to, for example an impeller, compressor rotor, and/or mechanical turbine rotor. In some electrical generation embodiments the drive shaft/hub may be directly or indirectly connected to, for example, one or more rotors and/or stators. However, it will be understood, in view of this disclosure, that many design alternatives to the above exist for PTO components mounted within a nacelle and that these alternatives are within the scope of this disclosure.

Figure 2A:
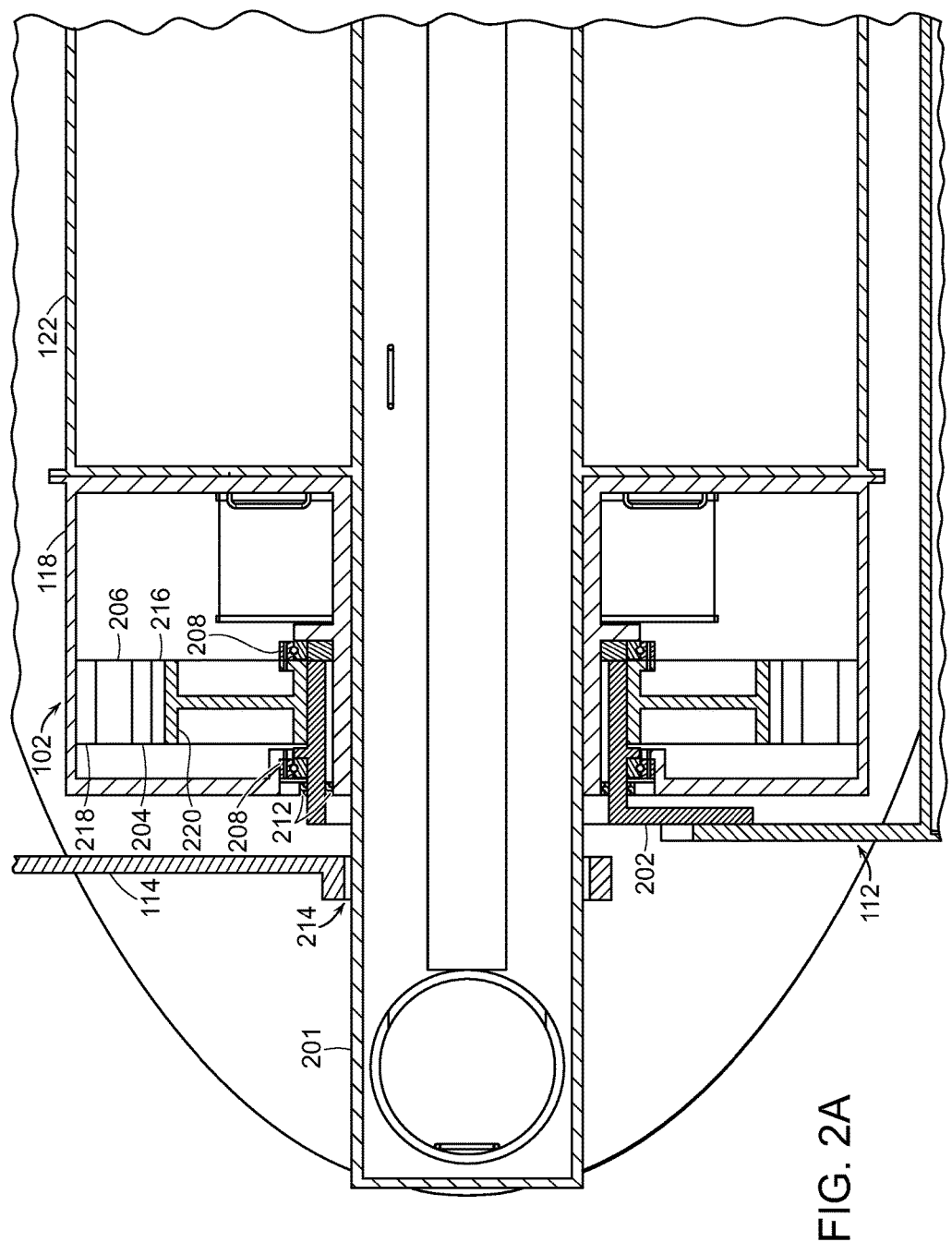
FIGS. 2A-B are cross-sectional top-views illustrating interior components of a WEC in accordance with various embodiments of the present invention.
Figure 2B:
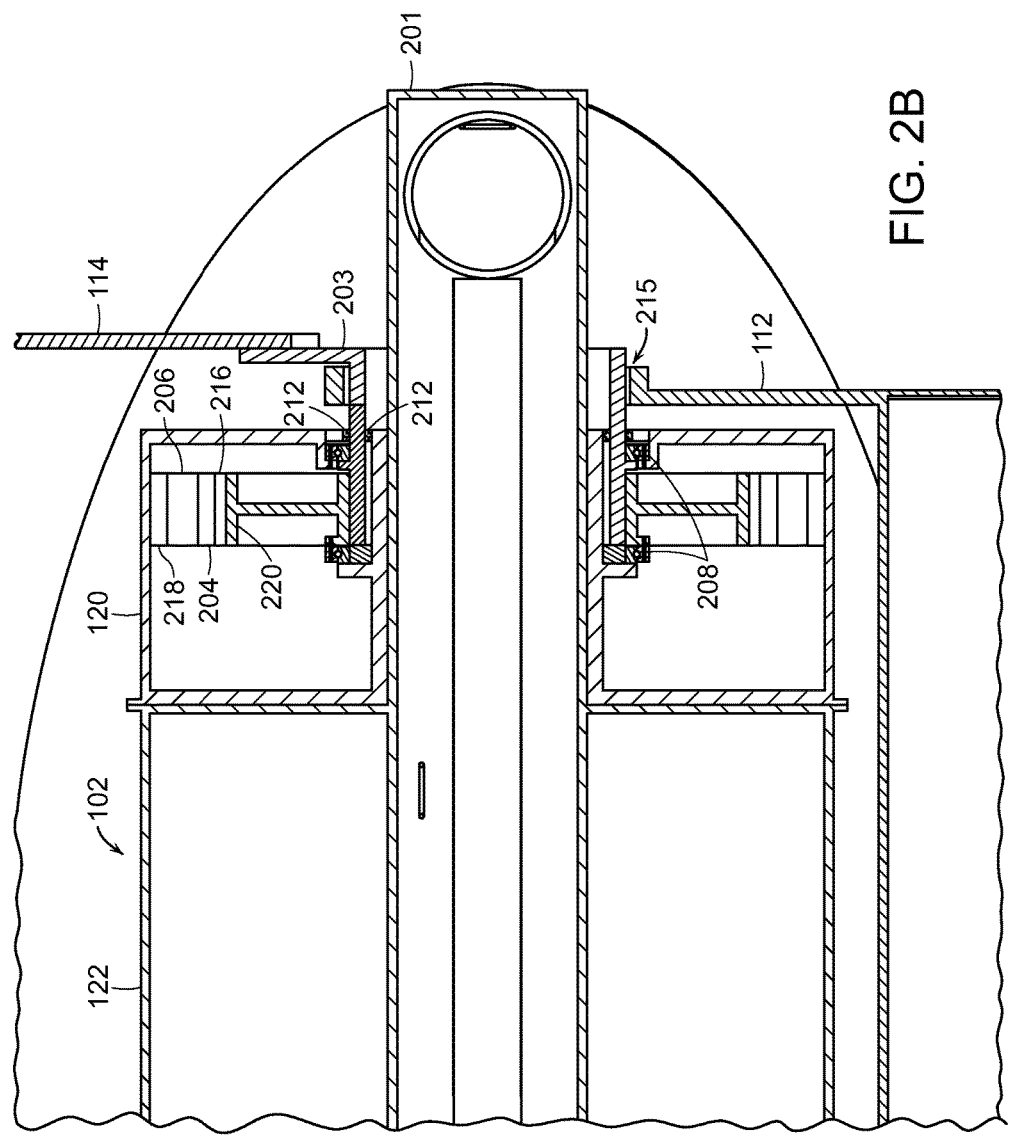
Figure 4:
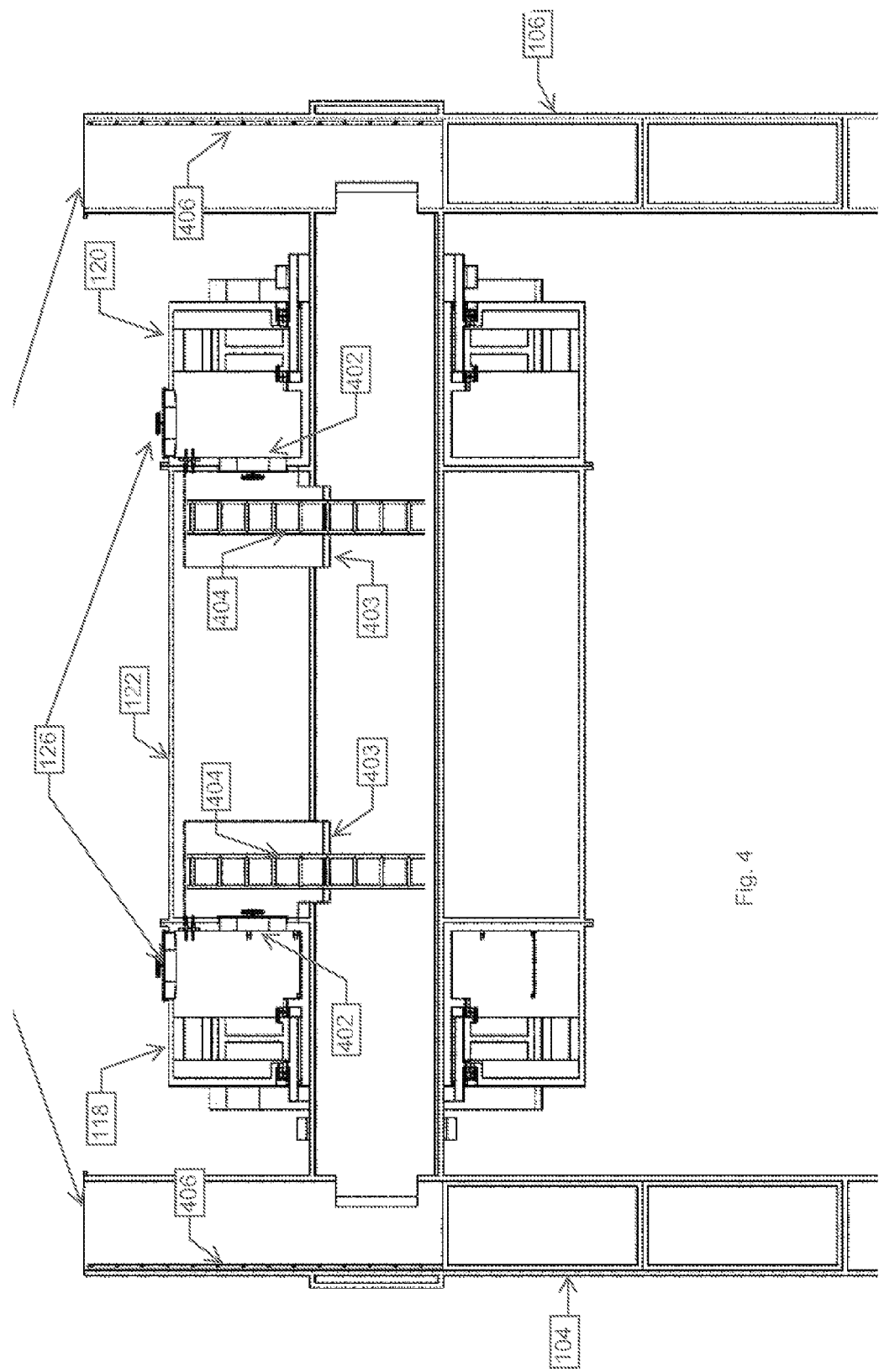
FIG. 4 is a cross-sectional front-view of a WEC illustrating various ingress/egress and access features in accordance with various embodiments of the present invention.

FIG. 2A provides a cross-sectional top-view of the nacelle 102, focusing on a first module 118 and FIG. 2B provides a cross-sectional top-view of the nacelle 102 focusing on a second module 120. In the embodiment depicted in FIGS. 2A-B, each of first module 118 and second module 120 is connected to a central module 122 and mounted over a spar-nacelle connection member 201. In some embodiments, the first module 118 and the second module 120 each contains a rotary-driven PTO. In power generation applications, such rotary-driven PTOs may include one or more rotors 204, which are rotatable in relation to one or more stators 206. Depending on the application, stators 206 may be independently rotatable or retained in a fixed rotational position relative to the nacelle 102. Relative rotation between the rotors 204, stators 206, spar-nacelle connection member 201, and/or the module 118, 120 within which the PTO is housed may be achieved by way of drive bearings 208, or any other bearing or similar mechanism which allows one or more components to freely rotate about or within another component.

In some embodiments, one or more rotors 204 may be integrated with a direct-drive shaft/hub 202, 203. In other embodiments, and as shown in FIGS. 2A-B, a drive shaft/hub 202, 203 may be connected to a radial extension 220, which is connected, via a rotor interface structure 216, to one or more rotors 204. However, it will be apparent in view of this disclosure that rotors 204 may be operatively connected to any drive shaft/hub 202, 203 via any other suitable means, including but not limited to, a gearbox or transmission, bolt-on, etc.

In various embodiments, one or more stators 206 may be fixedly or rotatably attached to an outer nacelle 102 and/or module 118, 120 via a stator interface structure 218. The rotor interface structure 216 and stator interface structure 218 may, in some embodiments be designed to control an air gap between rotors 204 and stators 206. Such interface structures 216, 218 may include, for example, retention slots, weld joints, braze joints, interference flanges, bolted or riveted flanges, mechanical rails, magnetic rails, or any other suitable gap control structure.

The drive shaft/hub 202, 203 may generally rotate about the spar-nacelle connection member 201 on drive bearings 208 or other suitable structures. In various embodiments, the drive shaft/hub 202, 203 may be sealed to the module 118, 120 and/or the spar-nacelle connection member 201 by one or more shaft seals 212 to prevent the intrusion of seawater and/or harmful foreign objects/debris.

The first float drive shaft/hub 202 may be operatively connected to a first float drive arm 112 adjacent the first module 118 while a second float drive arm 114 adjacent the first module 118 may be idle and freely rotatable about the spar-nacelle connection member 201 on a second float idle bearing 214. In various embodiments where allowing uninhibited 360-degree rotation of the floats 108, 110 is desirable, the second float drive shaft/hub 203 may be operatively connected to a second float drive arm 114 adjacent the second module 120 while a first float drive arm 112 adjacent the second module 120 may be idle and freely rotatable about the second float drive shaft/hub 203 on a first float idle bearing 215. In such embodiments, employing this asymmetrical design may enable the positioning of first float drive arms 112 and first float 108 within the region defined by second float drive arms 114 and second float 110 as described above with reference to FIGS. 1A-G.

While FIGS. 2A-B depict a WEC 100 having two PTOs, it will be apparent in view of this disclosure that any number of PTOs may be used. In various embodiments having a single PTO, the first float 108 may connect to the rotors 204, and the second float may connect to the stators 206, which may be rotatable stators. It will be further apparent in view of this disclosure that, although the rotors 204 are shown to be configured internal to fixed outer stators 206, the rotors 204 could be configured as outer rotors around fixed inner stators, or both the rotors 204 and stators 206 could be rotatable regardless of positioning.

In some embodiments, including the embodiment depicted in FIGS. 2A-B, the rotary-driven PTOs may be large-diameter direct-drive systems, (e.g., low-speed, high torque systems). Such systems have proven to represent a viable technical approach in connection with harnessing wind energy and the same slow-speed principles apply in the marine context. However, the technology described herein may be implemented using rotary-driven PTOs of any type, including, but not limited to, generator(s), gearbox and generator(s), hydraulics and generator(s), water pump(s), and/or any other suitable rotary PTO device.

Various embodiments in accordance with the present disclosure may include a hydrodynamic control system 116 (HCS) as described above. FIGS. 3A-D are side views of a WEC 100 in accordance with the present disclosure having HCSs 306, 308 positioned in varying locations along spars 302, 304 of various lengths. FIG. 3D shows HCS 308 fixedly attached to a relatively long spar 304. FIGS. 3A-3C illustrate a movable HCS 306 in various positions along the spar 302. Any mechanism (not shown) may be used to adjust the position of the hydrodynamic control system. Such mechanisms may, in some embodiments, be motorized drives. In other embodiments, there may be no motorized drives and HCS 306 may include a dynamic ballast control and a braking system for engagement with the spar. In such embodiments the HCS 306 may, for example, be repositioned along the spar 302 by releasing a brake, adjusting a ballast to buoyantly reposition the HCS 306, and engaging the brake to retain the repositioned HCS 306 in place. It will be apparent in view of this disclosure that the examples described above are not limiting, and that any number or combination of suitable adjustment mechanisms may be used with WECs 100 designed in accordance with the present disclosure.

As described above with reference to FIGS. 1A-G, various embodiments may include boarding areas (e.g., service platforms and/or docking fixtures) attached to one or more of the spars 104, 106 and/or nacelle 102 as well as, for some embodiments, nacelle access hatches 126 and/or spar access hatches 128 for improved service access for deployed WECs 100. Access hatches 126, 128 may generally be provided in the upper region of a nacelle 102 or an extended spar such that the access hatches 126, 128 are generally above the water line in non-storm conditions. Such access hatches may also be generally designed such that maintenance personnel and/or equipment can enter/exit the WEC 100 to gain further access to the components and interior equipment of the WEC 100.

Referring now to FIGS. 1A-G and FIG. 4, in some embodiments, ingress/egress of equipment, ballast and/or personnel to a WEC 100 may be provided via nacelle access hatches 126, spar access hatches 128, and/or any other hatch or airlock positioned on an exterior of any other component of the WEC 100. Nacelle access hatches 126 may provide access to the interior of a module 118, 120, 122, which may or may not house a PTO. Internal access hatches 402 and internal passageways 403 may, in some embodiments, provide access to other components of the WEC 100. Where vertical movement is desirable, interior nacelle ladders 404 may be provided. It will be apparent in view of this disclosure that, while ladders are depicted herein, any suitable vertical transport device (e.g., escalators, elevators, lifts, dumbwaiters, etc.), or even no vertical transport device at all, may be used in accordance with the present disclosure and may, for some embodiments, be preferred.

Spar access hatches 128 may provide access to the interior of a spar 104, 106. In some embodiments, boarding areas, (e.g., service platforms and/or docking fixtures) may be affixed to the exterior of one or more spars 104, 106 to provide an easier approach to the spar access hatches 128. Internal spar ladders 406 provide for vertical movement within the spar. However, while ladders are depicted herein, it will be apparent in view of this disclosure that any suitable vertical transport device (e.g., escalators, elevators, lifts, dumbwaiters, etc.), or even no vertical transport device at all, may be used in accordance with the present disclosure and may, for some embodiments, be preferred. Likewise, in horizontal passageways, railed overhead cranes or rigs (block & tackle, etc.), conveyor belts or rollers, etc. may be used in accordance with the present disclosure and may, for some embodiments, be preferred.

Figure 5:
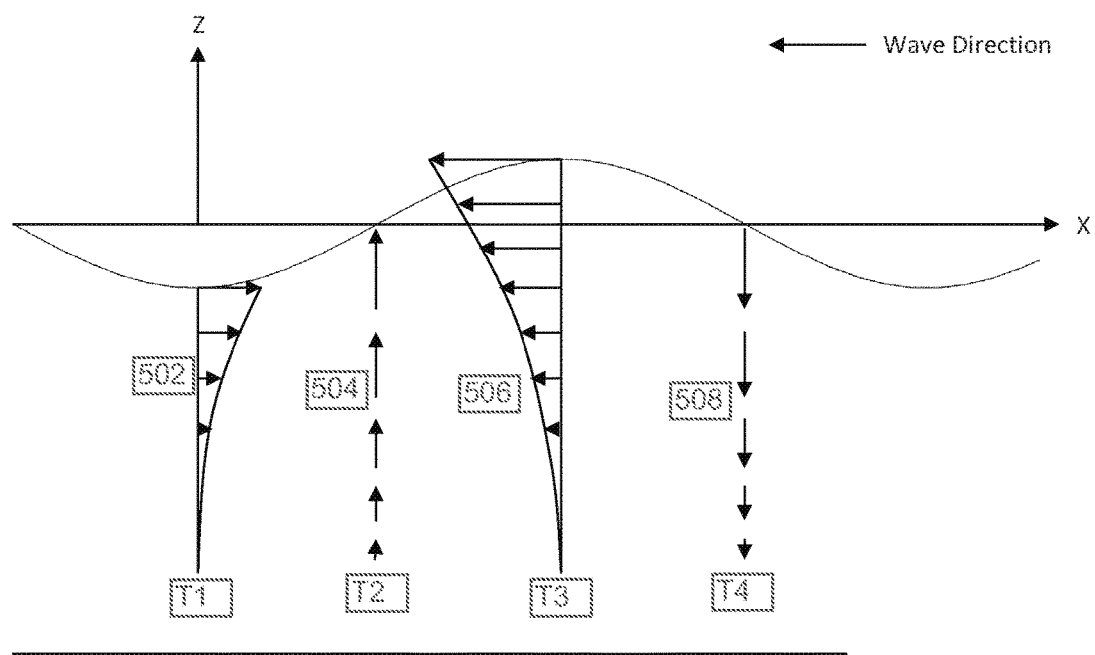
FIG. 5 is an illustration of particle velocities in a wave field in accordance with various embodiments of the present invention.

A movement in water of a WEC 100 designed in accordance with the present disclosure is described with reference to FIGS. 5-7. Water velocities within a wave are illustrated in FIG. 5. Particle velocities in the deep water wave field exhibit maximum amplitude in all 360 degrees of direction within a plane perpendicular to the crests of the propagating waves. Two discrete directions of these water particle directions are summarily described as heave and surge, depicted in FIG. 5. Heave describes the vertical up and down directions in the wave field, while surge represents the horizontal direction in the wave field that is perpendicular to the crests of the incoming waves. These water particle velocity vectors are of greatest magnitude at the free surface of the water and decrease exponentially toward zero as the water depth increases, therefore the strongest body interactions occur at the free surface of the water. The axis of rotation that acts in the heave-surge plane is described as pitch. To maximize energy capture, the wave energy converter should be excitable by the maximum amplitude vector in all 360 degrees of the wave at the free surface of the water, thus a device should be free to absorb energy in the three degrees of freedom described as pitch, surge, and heave and be located at or near the water's surface. At trough 502, water moves entirely in a reverse surge motion along a velocity gradient having a maximum velocity adjacent the surface of the water. At upward heave 504, water moves entirely in an upward heave motion. At peak 506, water moves entirely in a forward surge motion along a velocity gradient having a maximum velocity adjacent the surface of the water. At downward heave 508, water moves entirely in a downward heave motion.

Figure 6:
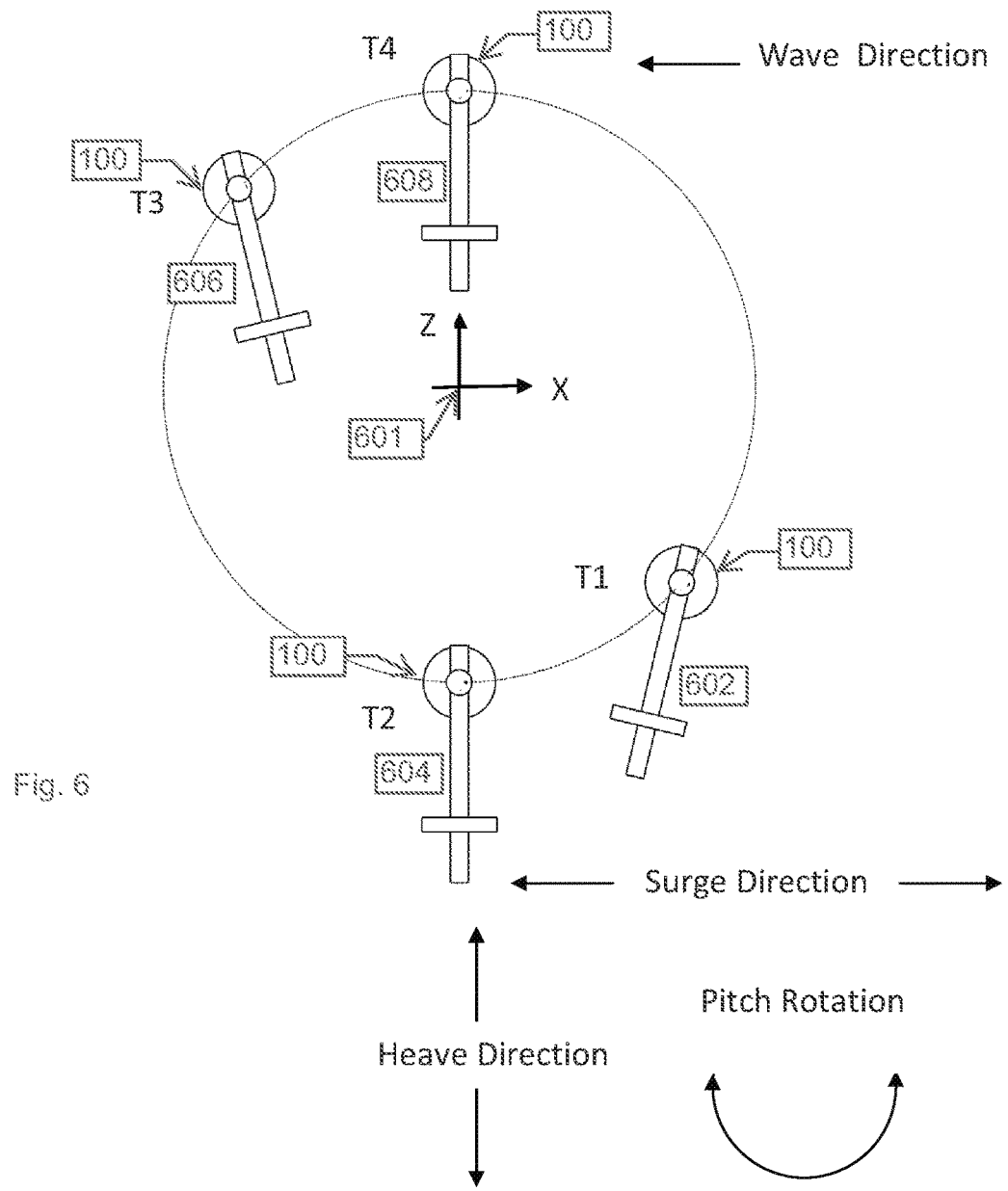
FIG. 6 is an exaggerated illustration of the orbital motion of a WEC in accordance with various embodiments of the present invention.
Figure 7:
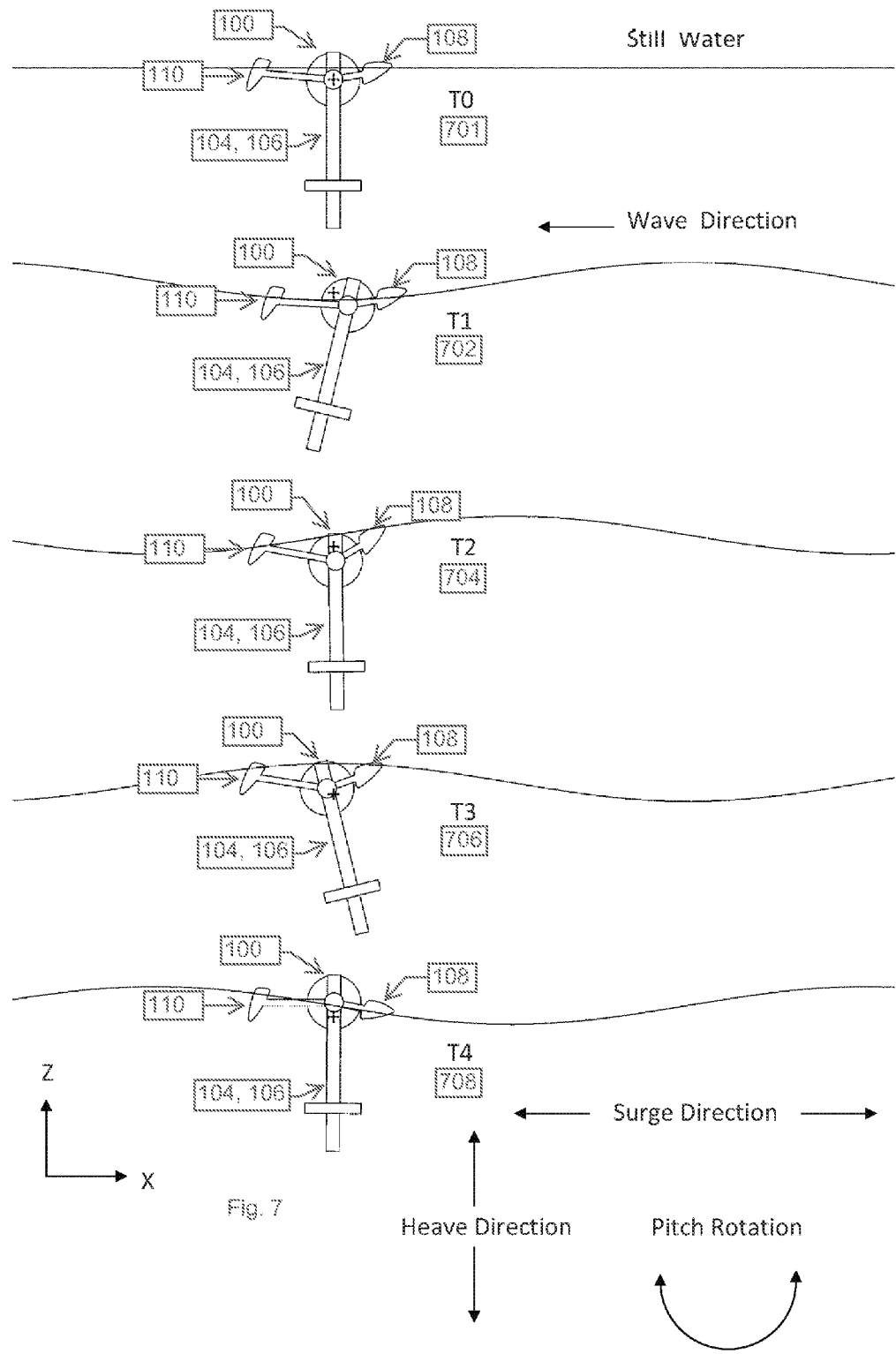
FIG. 7 is an illustration of the orbital motion of a WEC and the wave response motion of the first float and second float in accordance with various embodiments of the present invention.

In operation, as depicted in FIGS. 6 and 7, the WEC 100 is excited by the incoming waves to pitch, surge, and heave, resulting in a pitching orbital pattern described below. Shown at time T1 602, 702, the WEC 100 has moved in surge such that the spars 104, 106 and nacelle 102 are to the right (or aft) of center 601 and pitched clockwise. At time T2 604, 704, the spars 104, 106 and nacelle 102 have rotated counterclockwise in pitch to a vertical orientation and moved left (or forward) in the surge direction. At time T3 606, 706, the WEC 100 has moved in surge such that the spars 104, 106 and nacelle 102 are to the left (or forward) of center 601 and pitched counter clockwise. At time T4 608, 708, the spars 104, 106 and nacelle 102 have rotated clockwise in pitch to a vertical orientation and moved right (or aft) toward center 601 in the surge direction. These motions are exaggerated in FIG. 6 to aid in understanding the motions and in FIG. 7 the motions are representative of scaled motion.

In practice these motions occur in a 360 degree continuum of directions that are discretely described by the heave and surge vectors discussed above. Geometric dimensioning will affect the magnitude of WEC body response to the wave excitation; for example a larger surface will experience greater force on that body than a smaller surface. Additionally a different inertia of the WEC will result in a differing delay of the WEC body response in each degree of freedom to the wave excitation. The combination of buoy shape, CG and inertia will ultimately affect the phase and amplitude of WEC response to the incoming wave. FIG. 7 depicts the numerically computed phased response of the spars 104, 106 and nacelle 102 with respect to the wave for an 8.5 second wave period. Without device tuning, a differing wave period will result in differing WEC response and a different phase relationship with respect to the wave.

As depicted in FIG. 7, a first float 108 is nominally designed to approach an incoming wave such that it is forced by the wave to rotate about the central longitudinal axis of the nacelle 102. The first float 108 is designed to follow the wave's surface and primarily respond in phase with the wave in both heave and surge, resulting in a pitching motion of the first float 108 with respect to the nacelle 102. These heave and pitch motions of the first float 108 result in rotation of the first float 108 about the central longitudinal axis of the nacelle 102. The pitch motion of the nacelle 102 acts out of phase with that of the first float 108, thus increasing the velocity of relative rotational motion between the two bodies. This relative rotational motion is depicted in time steps T1, T2, T3, and T4 of FIG. 7 as described above.

As further depicted in FIG. 7, a second float 110 is nominally designed to approach the departing wave such that it is forced by the wave to rotate out of phase with the central longitudinal axis of the nacelle 102. The second float 110 is designed to maximize a pitching motion of the second float 110 with respect to the nacelle 102. These heave and pitch motions of the second float 110 result in rotation of the second float 110 about the central longitudinal axis of the nacelle 102. The pitch motion of the nacelle 102 acts out of phase with that of the second float 110, thus increasing the velocity of relative rotational motion between the two bodies. This relative rotational motion is depicted in time steps T1, T2, T3, and T4 of FIG. 7 as described above. The radial distance of the second float 110 from the nacelle 102 is nominally greater than that distance for the first float 108. This distance is tunable for different site locations or wave climates.

In many embodiments, it is desirable to keep the WEC 100 on station relative to a wave field, at a desired orientation relative to a wave field, and/or autonomously (i e, manned or unmanned, but not towed) move the WEC 100 between wave fields. One or more such functions may be accomplished, in various embodiments, by the inclusion of, for example, one or more mooring system(s), or one or more propulsion system(s). For embodiments including propulsion systems, the propulsion may be provided by any suitable propulsion device (e.g., propeller, pumpjet, paddle wheel, magnetohydrodynamic drive, etc.). Such propulsion systems may be mounted on any WEC 100 component (e.g., spars 104, 106, floats 108, 110, nacelle 102, HCS 116, etc.) to provide yaw control, autonomous transport between deployment sites, station keeping at a deployment site, or any other purpose for which propulsion systems may be used.

Many embodiments in accordance with the present disclosure include a mooring system, which may be designed to keep the WEC 100 on station relative to a wave field (not shown) without over-ranging the electrical line 810. The mooring system may be any of a slack, low-column, mid-column, or high-column mooring system having one or more mooring lines that attach to WEC 100. In some embodiments, the mooring system may also be used to control yaw of the WEC 100 relative to the wave field. In such embodiments, the WEC 100 may be passively self-oriented by the mooring system 800 and/or vanes/rudders attached to the WEC 100 or may include a mechanism (not shown) such as, for example, a chain or cable winch for shortening or lengthening any of the mooring lines, thereby rotating the WEC 100, a rotatable interface between the mooring system and the WEC 100 such that the WEC 100 rotates relative to the mooring system, or any other suitable mechanism for controlling yaw or other positioning of the WEC 100.

Figure 8A:
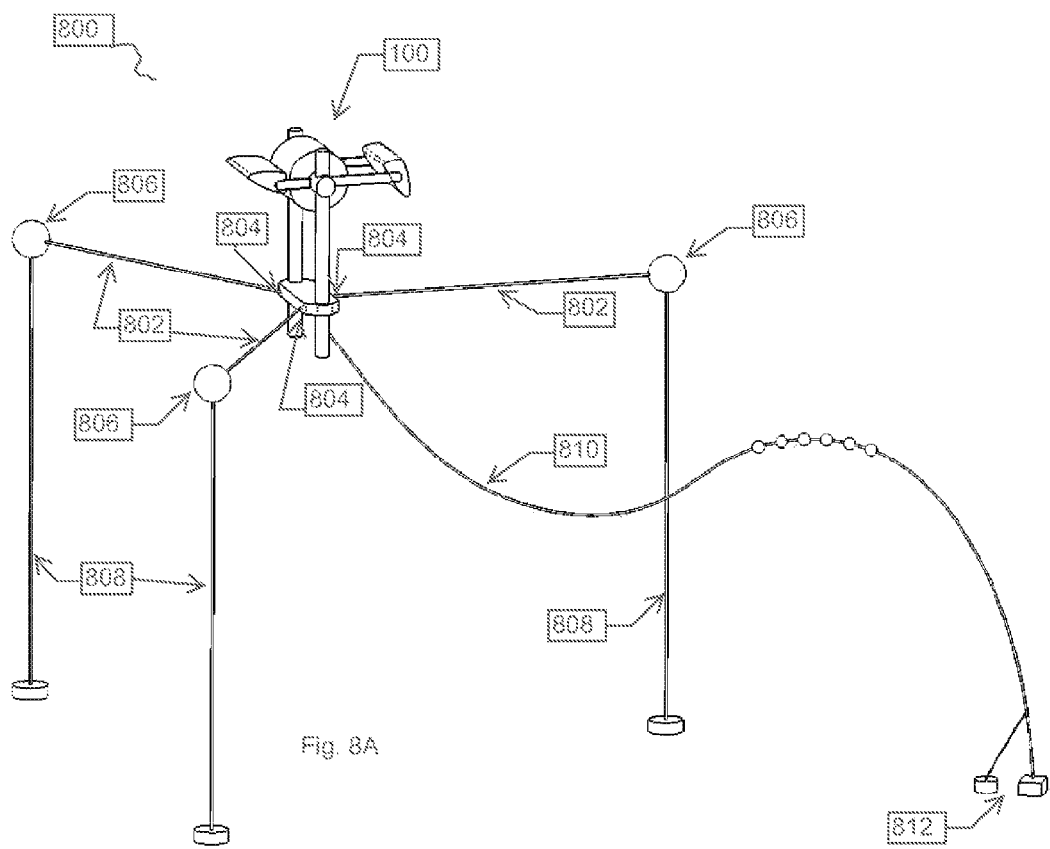

As shown in FIG. 8A, a three-point mooring system 800 may be used to control directionality. As shown in FIGS. 8B-F, two-point or one-point mooring systems 800 may also be used. Each such mooring system may be designed such that each of the horizontal mooring lines 802 joins a HCS 116 at a connection point 804. It will be apparent in view of this disclosure, however, that one or more horizontal mooring lines 802 may be attached to any component of a WEC 100 (e.g., floats 108, 110, spars 104, 106, nacelle 102, etc.). Although each of the horizontal mooring lines 802 is shown in FIGS. 8A-F to join the WEC 100 at an independent connection point 804, it will be apparent in view of this disclosure that each mooring line may alternatively join the WEC 100 at a common connection point 804. As further illustrated in FIGS. 8A-F, each horizontal mooring line 802 may be attached to a mooring buoy 806, which may then be connected to a vertical mooring line 808. It will be understood in view of this disclosure that horizontal mooring line 802 and vertical mooring line 808 may be the same mooring line and connected to mooring buoy 806. It will be further understood in view of this disclosure that the term mooring buoy 806 as used herein also includes low-column, mid-column, and high-column buoys and that such buoys may have any positive or negative buoyancy. Specifically depicted in the illustrative examples of FIGS. 8A-F are mid-column buoys, which may, in some embodiments, have a net positive buoyancy ranging from 10,000 lbs. to 100,000 lbs.

Figure 8F:
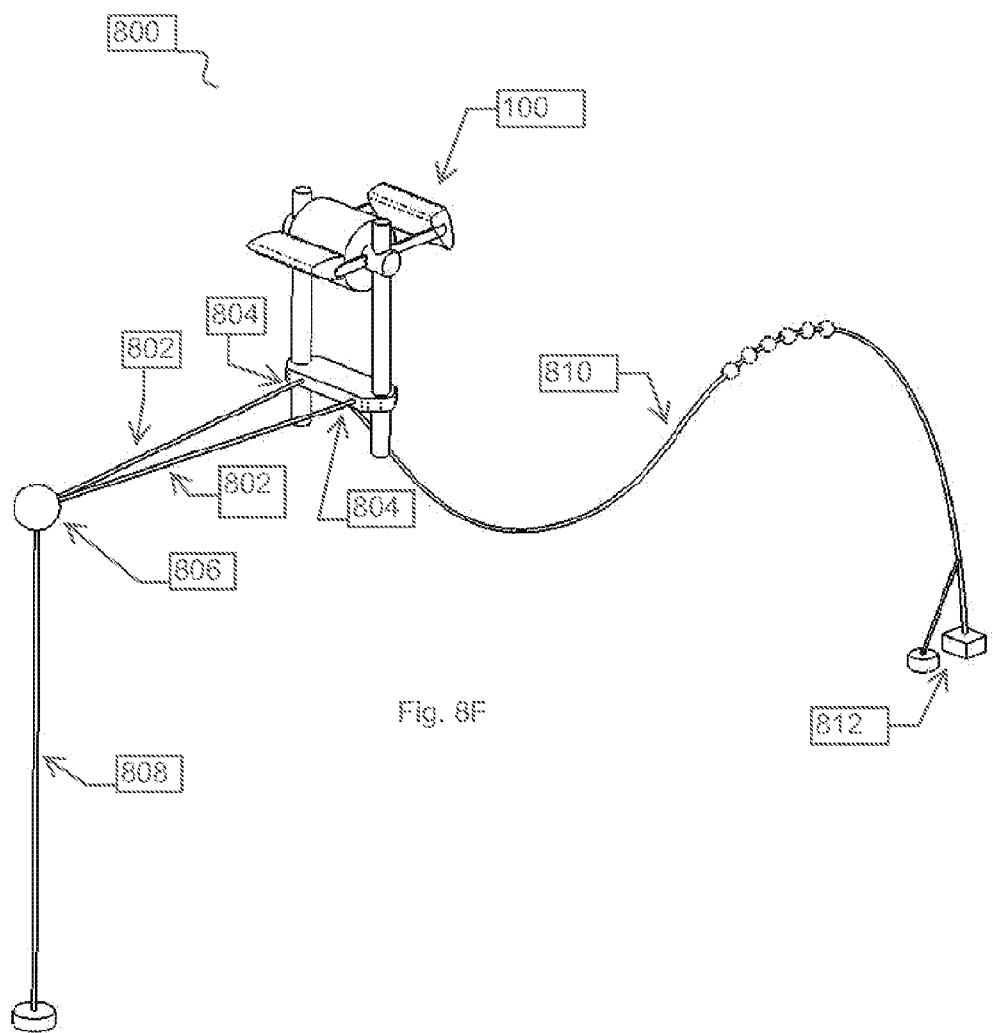
Figure 11:
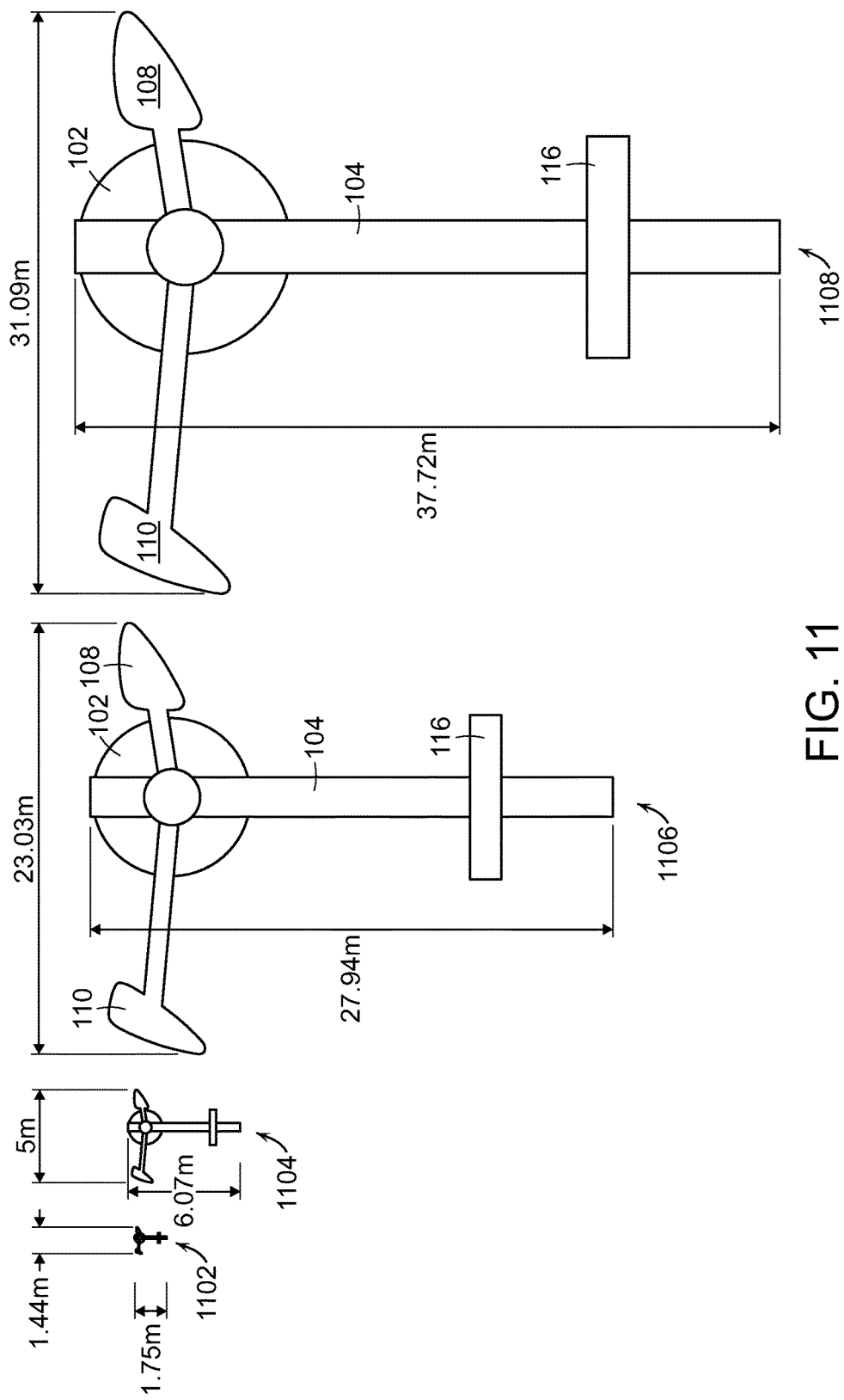
Figure 12A:
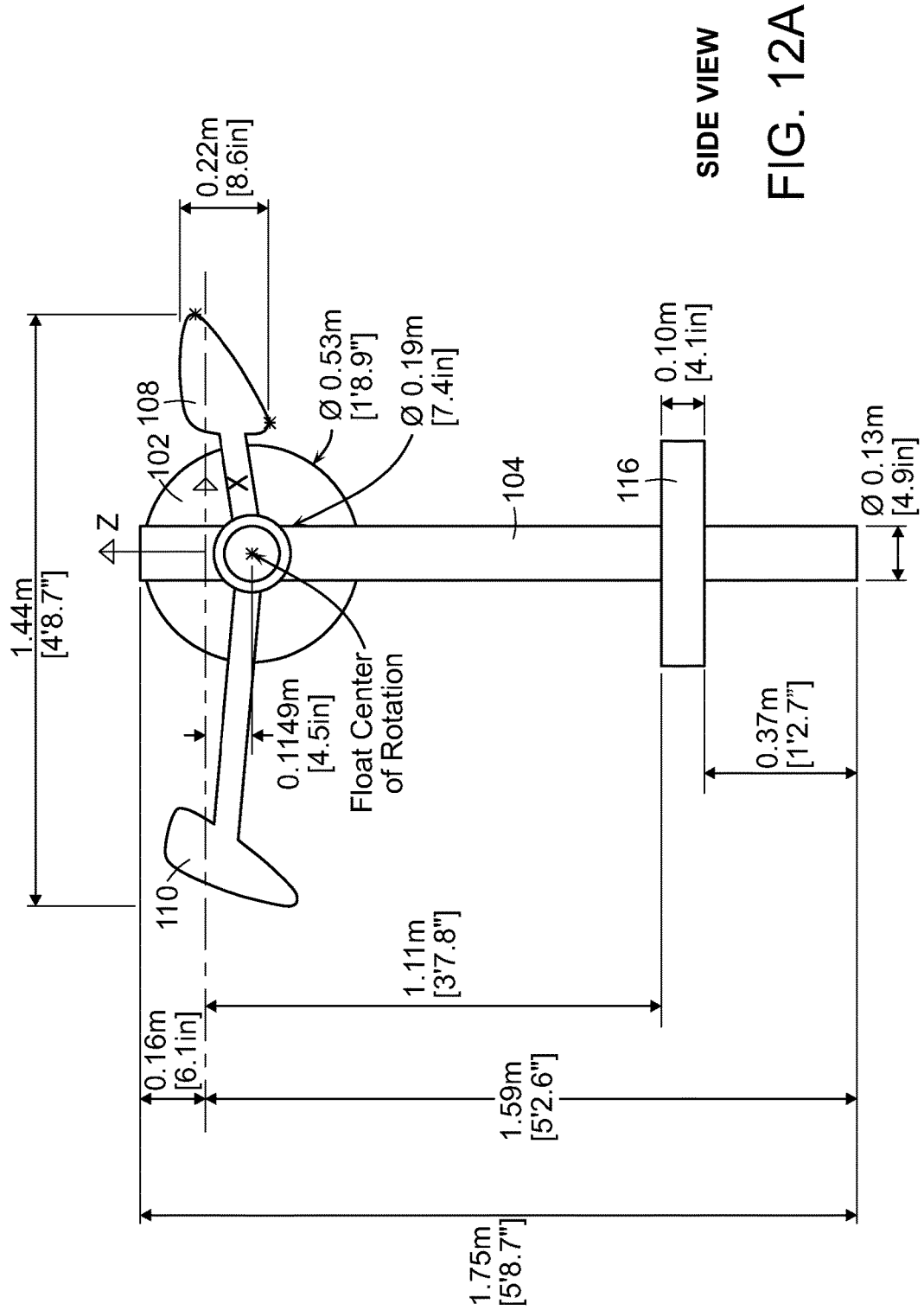
FIGS. 12A-C are dimensional schematics of a small-scale WEC in accordance with various embodiments of the present invention.
Figure 12B:
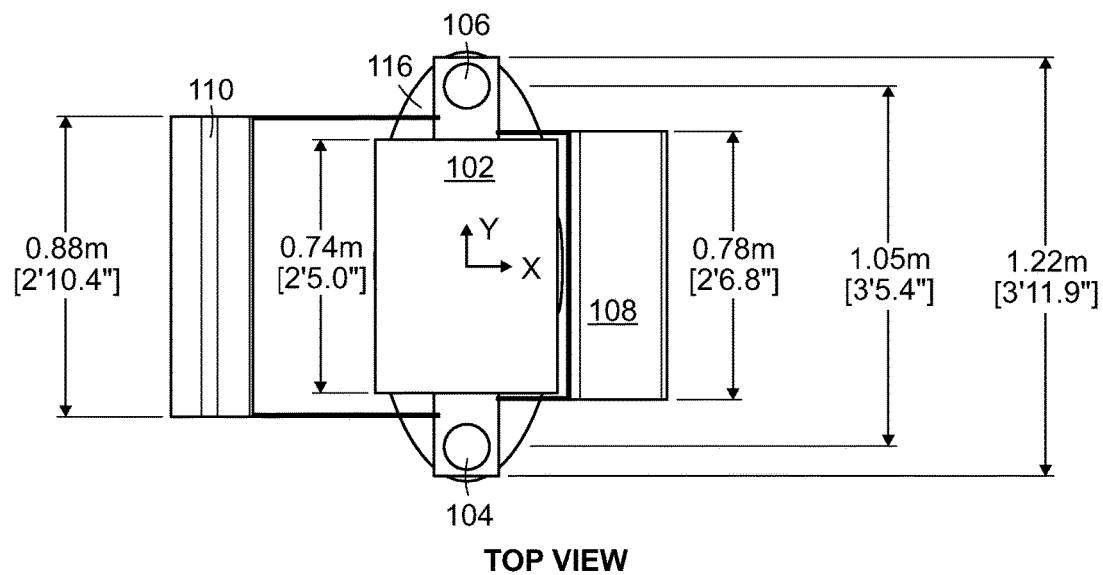
Figure 12C:
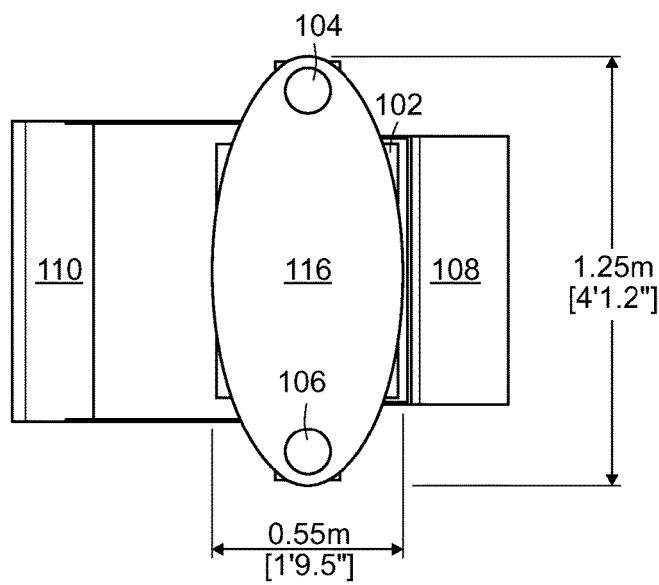
Figure 13B:
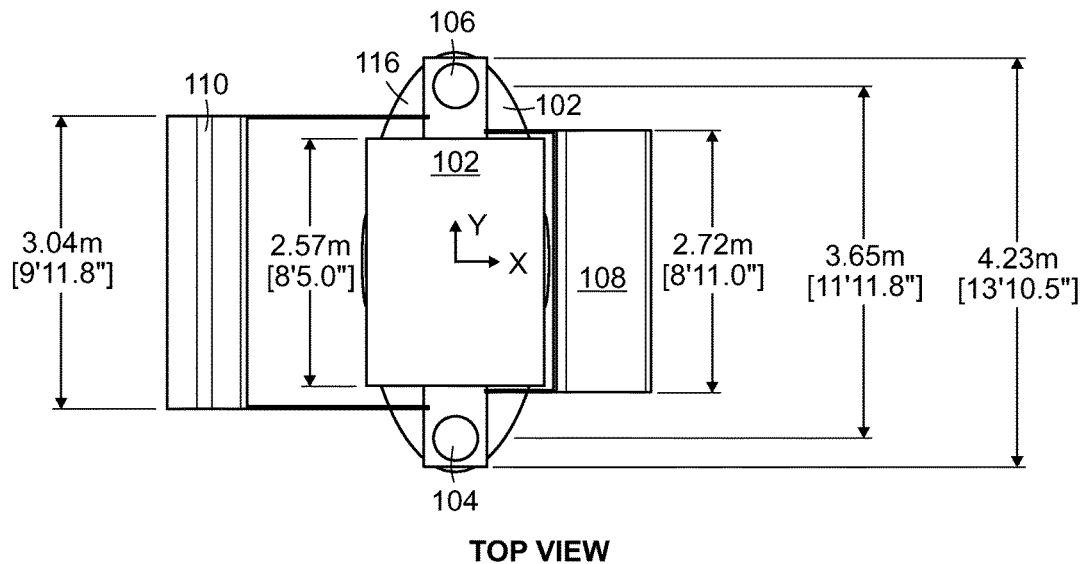
Figure 13C:
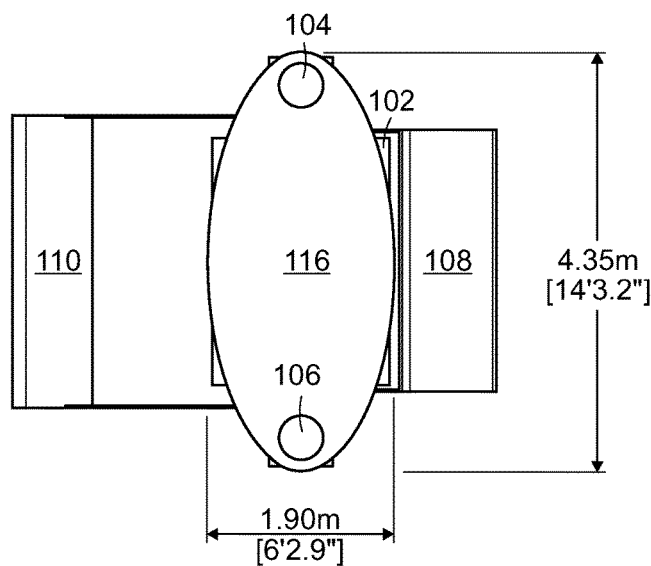
Figure 14A:
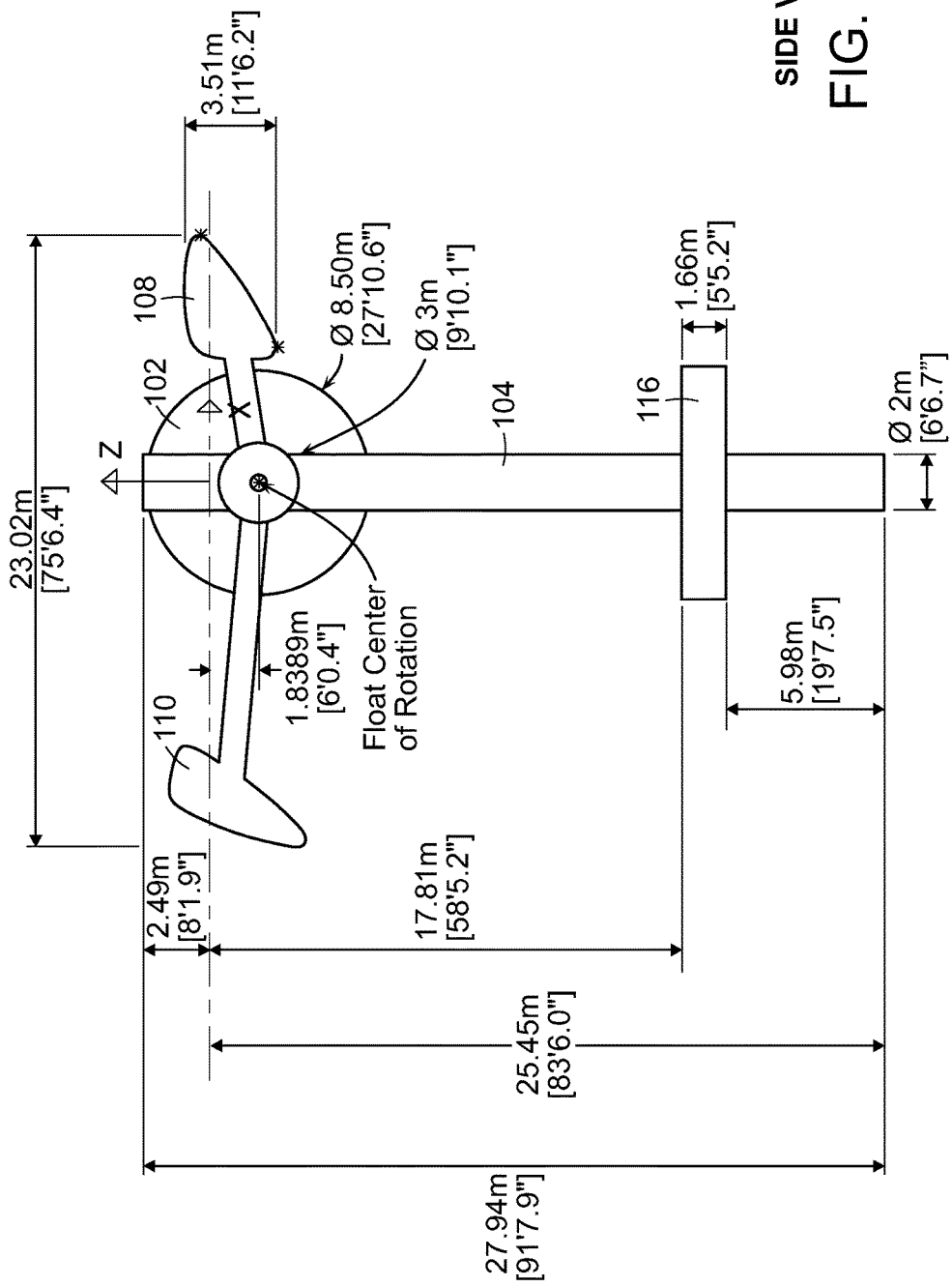
FIGS. 14A-C are dimensional schematics of a large-scale WEC for deployment in moderately active wave fields in accordance with various embodiments of the present invention.
Figure 14B:
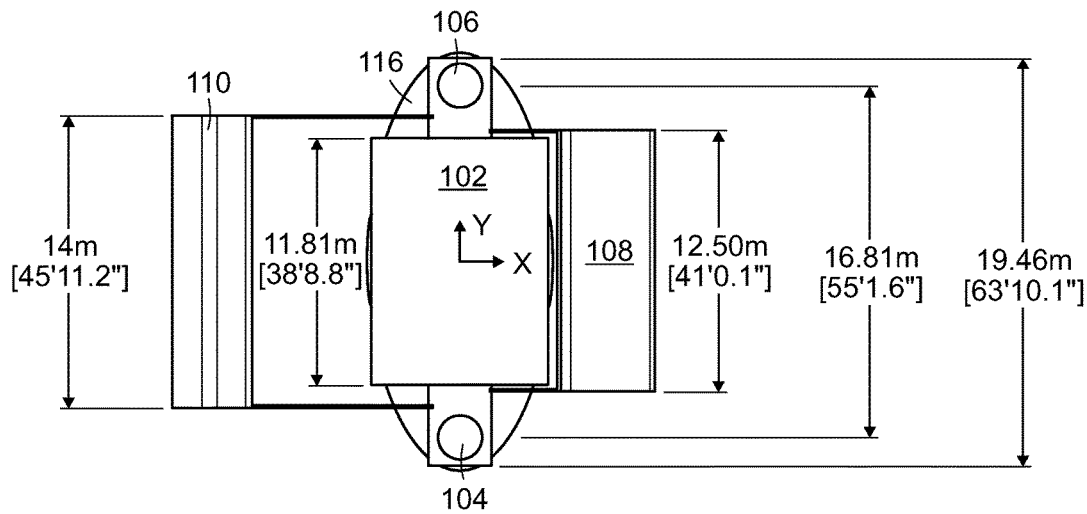
Figure 14C:
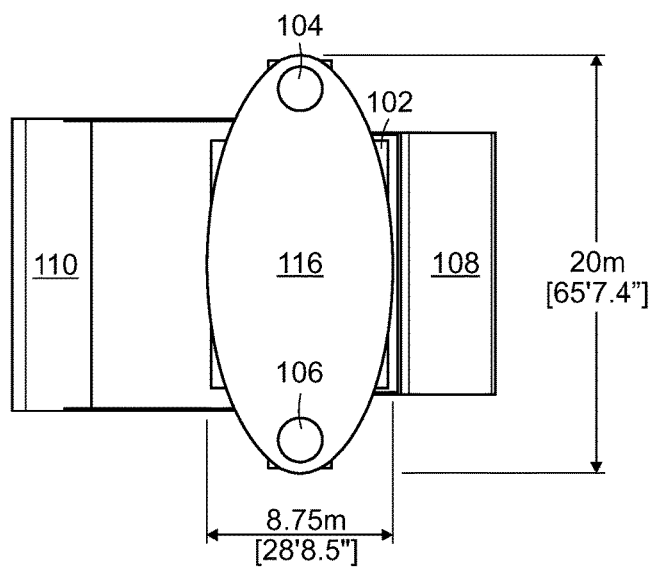
Figure 15A:
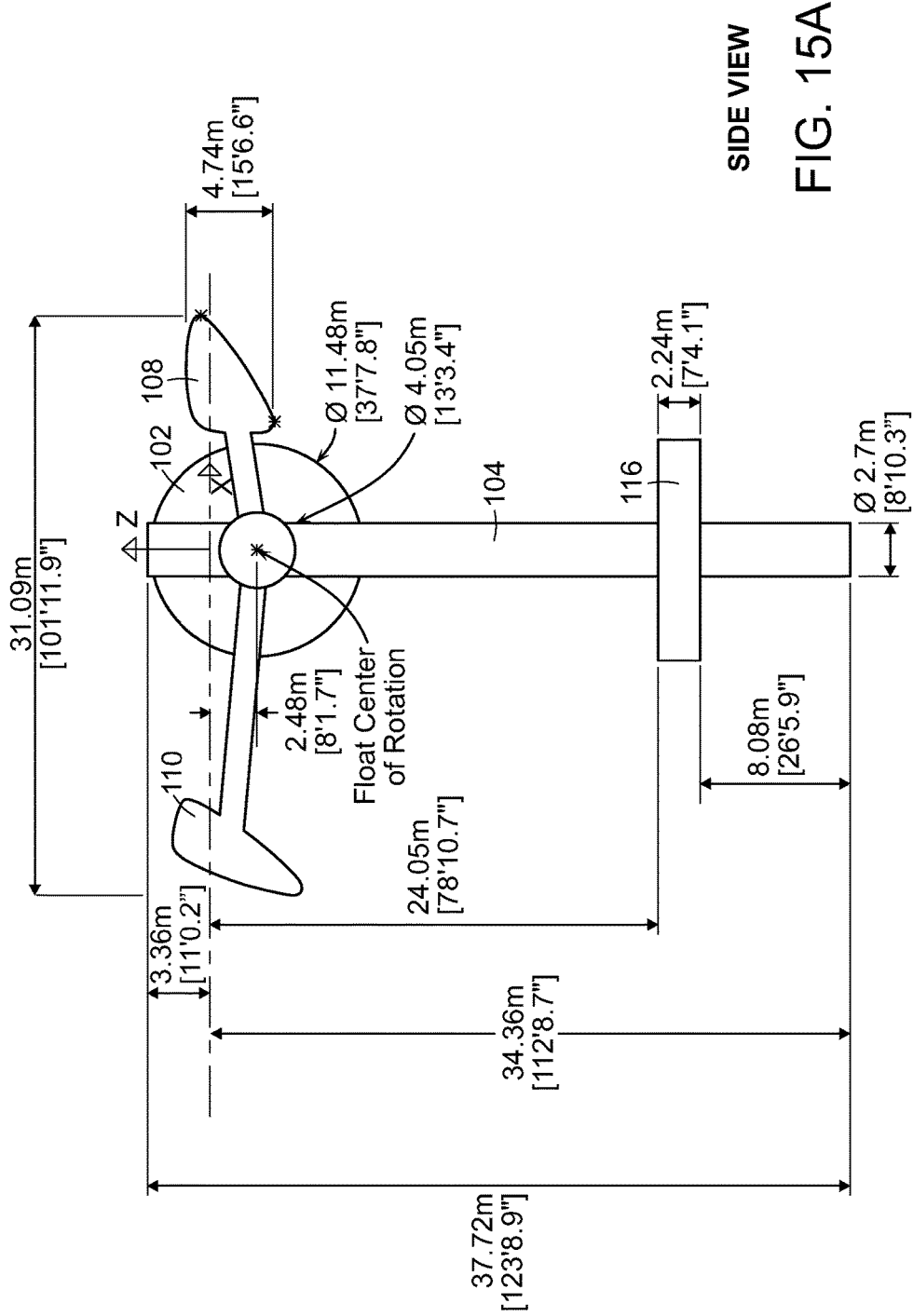
FIGS. 15A-C are dimensional schematics of a large-scale WEC for deployment in highly active wave fields in accordance with various embodiments of the present invention.
Figure 15B:
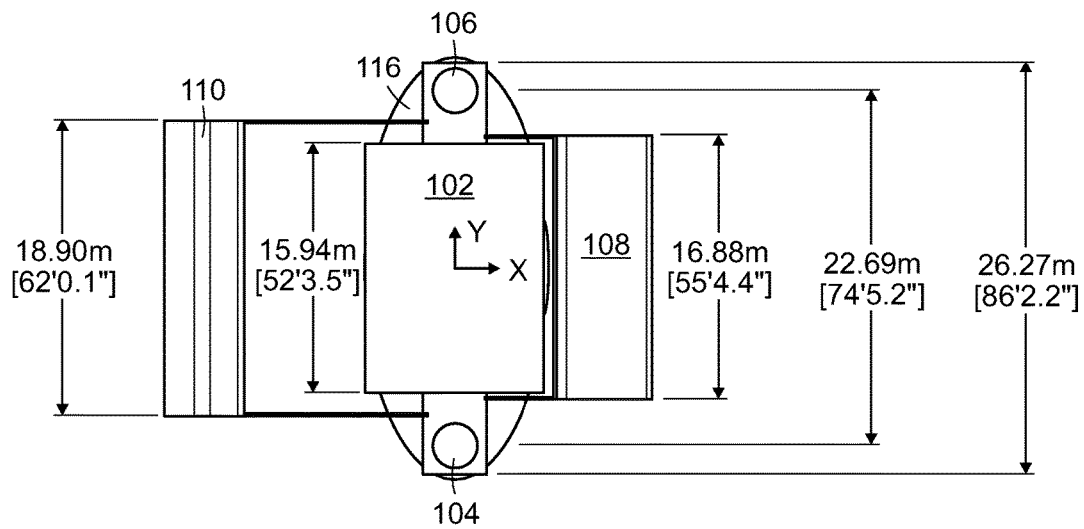
Figure 15C:
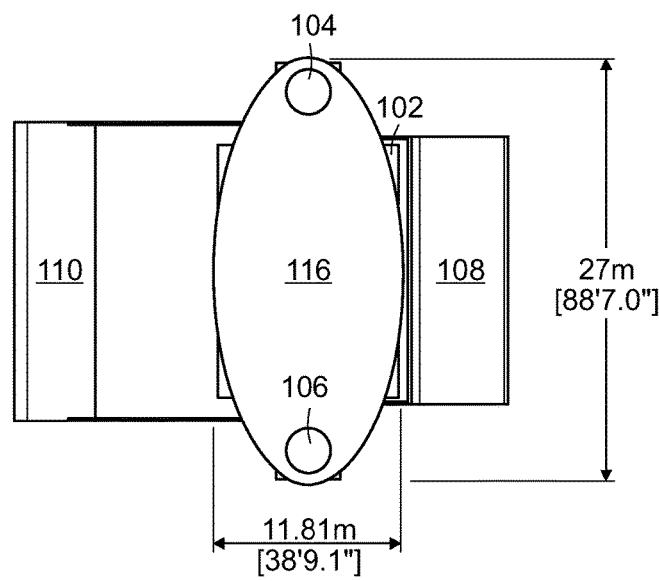

In accordance with some embodiments, FIG. 8F depicts a single mooring leg approach. In such embodiments, the WEC 100 is attached at a forward region of an HCS 116 and a single mooring leg comprised of a vertical mooring line 808 or lines, a horizontal mooring line 802 or lines and a mooring buoy 806 or buoys. The mooring lines 802, 808 may be made of, for example, cable, nylon, polyester, chain, any other suitable material, or any combination of these. A single mooring leg of this configuration, connected to the forward region of a HCS 116 may, in various embodiments, allow for the WEC 100 to rotate and passively align to head into the oncoming wave. Numerical analysis confirms that a forward connection improves such a system's ability to passively orient into the oncoming wave. The use of different mooring line materials and different buoyancies of the mooring buoy may allow the designer to select a preferred load-displacement behavior and maximum load capabilities of the mooring leg.

A single leg mooring as illustrated by FIG. 8F may provide for reduced costs, reduced environmental impact and/or passive orientation. In some embodiments, however, a three point mooring may be used as depicted in FIG. 8A. In various such embodiments, directional controls may be attached to the WEC 100 and mooring to rotate the WEC into the oncoming waves.

FIGS. 8B-E depict different attachment positions 804 to the forward region of the HCS 116. In some embodiments illustrated by FIG. 8B, a single horizontal mooring line 802 attaches to the center of the HCS 116. In the other configurations illustrated in FIGS. 8C-E, two horizontal mooring lines 802 are attached to the HCS 116 at progressively wider spacing. This spacing of the horizontal mooring line(s) 802 allows for varied degrees of yaw stability of the WEC 100 at the mooring attachment. Furthermore, any mooring line 802, 808 and/or any number of mooring lines 802, 808 may be joined at any location on the WEC 100. In various power generation embodiments, the WEC 100 may also be connected to an electrical output destination 812 via an electrical line 810. Electrical line 810 may be supported to follow any underwater path and is not limited to the "lazy s-curve" configuration shown in FIGS. 8A and 8F. Electrical output destinations 812 may include, but are not limited to, utility grids, transformers, batteries, devices, equipment, or vessels that consume electrical power, etc.

In various embodiments wherein uninhibited 360-degree rotation of one or more floats 902, 904 is possible, one or more floats 902, 904 may become overtopped as shown in FIG. 9A, such that the overtopped float (e.g., 904 as shown) is capsized and aft of the nacelle 906. Most commonly this will result from a force exerted by a large wave. The floats 902, 904 are safe, and operational, in this position; however, such floats 902, 904 may not be producing optimum power. When operationally appropriate, it may be preferred that some method be in place to return the float to the forward position.

In various embodiments, illustrated in FIGS. 9A-F, the overtopped float 904 may be dynamically ballasted such that it becomes negatively buoyant and sinks to a lower vertical orientation as depicted in FIGS. 9B-C. From this position, the overtopped float 904 may be de-ballasted such that a ballast chamber at the top of the overtopped float 904 is buoyant, thereby creating a moment to rotate the float in the forward direction as depicted in FIG. 9D. The overtopped float 904 may then rise into proper position at the surface as depicted in FIGS. 9E-F. In other embodiments, the ballasting sequence described above may be implemented, but the float motion is supplemented with a controlled application of generator damping. In such a damping control mode, damping (torque) may be applied to the first PTO when rotating in the aft direction and damping (no torque) may not be applied when rotating in the forward direction. This damping control mode acts similar to a ratchet mechanism, or soft ratchet, promoting motion of an overtopped float toward the correct orientation.

In further embodiments, the ballasting sequence described above may be implemented, but the float motion is supplemented with a controlled application of motor operation. In such motorized control modes, the first PTO may be driven as a motor to drive the overtopped float into the correct orientation. In still further embodiments, the overtopped float is completely de-ballasted and the float motion is supplemented with a controlled application of motor operation to drive the first float back over the top of the nacelle 906 to drive the overtopped float into the correct orientation. In yet still further embodiments, requirements may exist to prevent uninhibited 360-degree float 902, 904 rotation. Examples of such embodiments may include special operational or deployment scenarios that do not allow float overtopping. In systems with this need, end stops or limit straps may be used to constrain float motion.

In many embodiments in accordance with the present disclosure, the spars 104, 106 have a deep draft and are too deep for vertical orientation when towed into or out of port. One skilled in the art will recognize in view of this disclosure that certain positioning of the floats 108, 110, nacelle 102, and spars 104, 106 relative to the ocean surface will have beneficial results for certain modes of transport and operation. For example, in some embodiments the WEC 100 may need to be towed to or from its operational location for deployment or recovery in an orientation different from its nominal operating position. The position that allows for the least drag may also reduce unnecessary forces on the operable components (e.g., floats 108, 110, spars 104, 106, nacelle 102, etc.) during transport. Reorientation of a float 108, 110 and/or a spar 104, 106 may occur due to changes in ballast or operational conditions. To improve the ability to transit the WEC 100 into and out of port, the lower regions of the spars 104, 106 and a HCS 116 may be designed to be de-ballasted or attached with lift bags to raise the low region to the surface. In this position, the floats 108, 110 may be positioned between the nacelle 102 and HCS 116 as depicted in FIGS. 10A-B. In this case, maximum component deballasting will allow for the WEC 100 to minimize its draft and maximize the navigable waterways through which it can move in tow without hitting bottom.

Likewise, in embodiments requiring advance preparation for survival mode or extreme waves or weather, it will be apparent in view of this disclosure that, by PTO control, ballast control, locking mechanism, braking mechanism, ratchet mechanism or any combination of these approaches, a float may be lowered below the water surface. In some such embodiments, the first float 108 is reoriented to a nested floating position as depicted in FIGS. 10A-B with the nacelle 102 serving to shadow the weather, providing protection and increasing survivability. In various embodiments the first float 108 may still be operational in this nested position and able to capture energy. In further embodiments, as depicted in FIG. 10D, a float is ballasted to be lower in the water and less exposed to severe weather or other conditions. In the most extreme weather conditions, when all measures are necessary to assure survivability, the first float 108 and second float 110 may be ballasted with water to submerge both into a vertical orientation as depicted in FIG. 10C. In still further embodiments, environmental conditions may dictate that a float 108, 110 rotate to a position in which it is nested with another float. The float 108, 110 can be returned to its nominal position by PTO control, ballast control, locking mechanism, braking mechanism, ratchet mechanism or any combination of these approaches.

Exemplification

WECs 100 and their constituent components (e.g., floats 108, 110, spars 104, 106, nacelles 102, HCSs 116, etc.) made in accordance with the present disclosure may be configured with any size, shape, relative position, or combination thereof. However, in many embodiments it may be preferred to optimize WEC 100 design (e.g. varying sizes, positions, and geometries of floats 108, 110, spars 104, 106, nacelles 102, HCSs 116, etc.) to maximize energy output relative to cost (e.g., minimize a cost of energy (COE)). Each WEC 100 design may be optimized in view of mission parameters (e.g., pumping, powering a data buoy, powering a surveillance sonobuoy, powering an oil platform, providing utility-scale electricity to a grid, etc.) and one or more wave climate conditions in which the WEC 100 may be deployed. FIGS. 11-15C depict the details of four exemplary configurations of WECs 100 optimized for various mission/climate inputs.

Referring now to FIGS. 11, 12A-C, 13A-C, 14A-C, and 15A-C, the exemplary WECs 100 shown may be used for a range of applications. The smallest illustrated example 1102 is a 10 Watt, 500 pound displacement system having a fully deployed length of 1.44 meters and a fully deployed depth of 1.75 meters. Such systems may, in some embodiments, drive low volume pumps and/or deliver electricity to low power sensors (e.g., wave instruments, temperature sensors, salinity sensors, wind sensors/anemometers, RF or satellite communications, etc.). Additional specifications of a WEC 100 in accordance with this exemplary embodiment are provided in FIGS. 12A-C.

The second illustrated example 1104 is a 1,500-5,000 Watt, 10,000-40,000 pound displacement system having a fully deployed length of 5 meters and a fully deployed depth of 6.07 meters. Such systems may, in some embodiments, drive somewhat higher volume pumps (e.g., water or oil) than a 500 pound displacement system 1102 and/or deliver electricity to various devices (e.g., unmanned underwater vehicle charging, autonomous vehicle charging, autonomous underwater vehicle charging), sensors as described above, or and/or various vessels/platforms (e.g., oil platforms). Additional specifications of a WEC 100 in accordance with this exemplary embodiment are provided in FIGS. 13A-C.

The third illustrated example 1106 is a 200 kW, 1,400 ton displacement system having a fully deployed length of 23.03 meters and a fully deployed depth of 27.94 meters. Such a system may, in many embodiments, be used for utility-scale electric-grid or other offshore energy applications in moderate-activity wave fields. Additional specifications of a WEC 100 in accordance with this exemplary embodiment are provided in FIGS. 14A-C.

The largest illustrated example 1108 is a 400 kW-1 MW or more, 3,000 ton displacement system having a fully deployed length of 31.09 meters and a fully deployed depth of 37.72 meters. Such a system may, in many embodiments, be used for utility-scale electric-grid applications in high-activity wave fields. Additional specifications of a WEC 100 in accordance with this exemplary embodiment are provided in FIGS. 15A-C.

Based on considered mission requirements and worldwide wave field characteristics, geometric dimensions ranging from 1 m to 36 m in fully deployed length and from 1.5 m to 45 m in fully deployed depth may be appropriate. However, it will be apparent that WECs 100 in accordance with the present disclosure may be larger or smaller depending on variations in the circumstantial inputs described above.

It is noted that the foregoing examples have been provided merely for the purpose of explanation and are in no way to be construed as limiting of the present invention. While the present invention has been described with reference to various exemplary embodiments, it is understood that the words which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

Method

Figure 16:
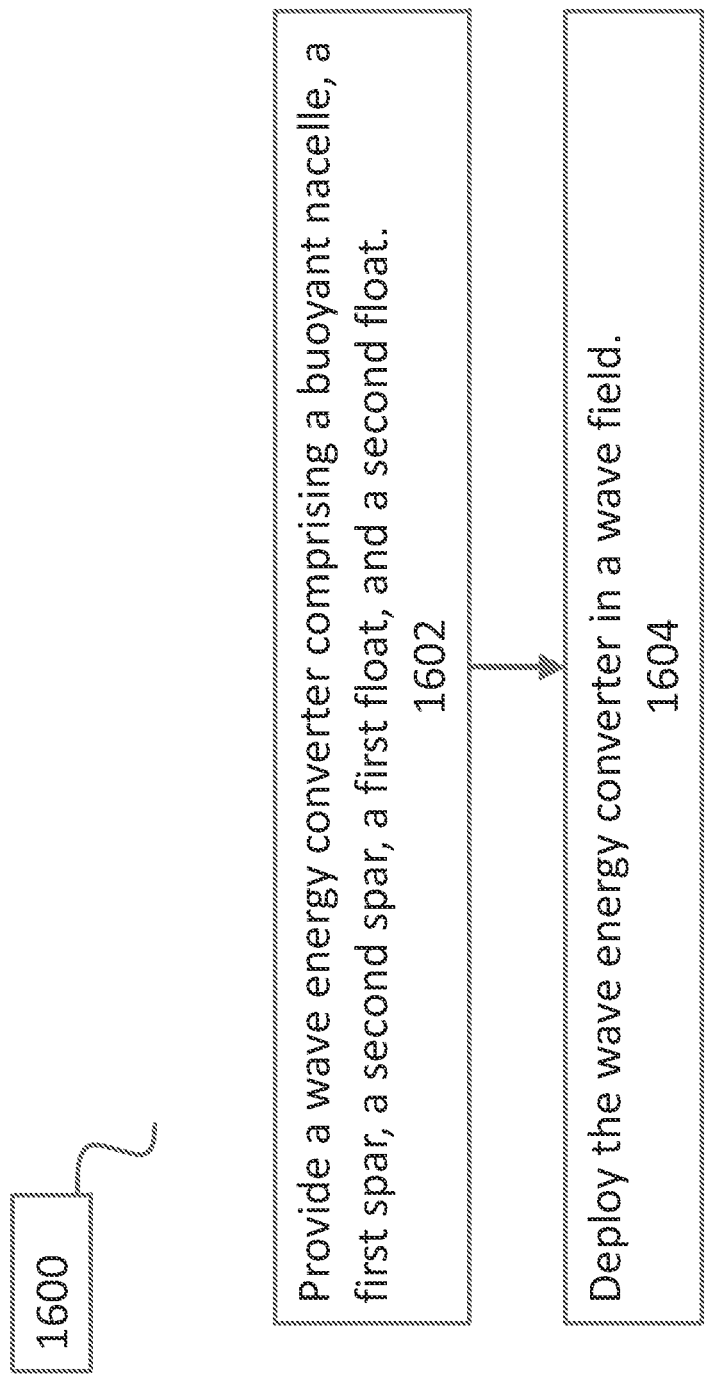
FIG. 16 is a flowchart illustrating a method in accordance with various embodiments of the present invention.

In another aspect the present disclosure includes methods for generating power using a WEC 100. FIG. 16 illustrates a method for generating power in accordance with various embodiments of the present disclosure comprising the steps of providing a wave energy converter (WEC) comprising a buoyant nacelle, a first spar, a second spar, a first float and a second float 1602 and deploying the WEC in a wave field 1604.

Providing a WEC comprising a buoyant nacelle, a first spar, a second spar, a first float, and a second float 1602 with various embodiments may include providing any WEC designed in accordance with the concepts and embodiments described above with reference to FIGS. 1-15. Deploying the WEC in a wave field 1604 may include deploying the wave energy converter in, for example, any body of water (e.g., ocean, sea, bay, river, lake, wave pool, etc.) of suitable width, length, and depth to accommodate the WEC.

In the foregoing specification, the invention has been described with reference to specific embodiments thereof. However, one skilled in the art will realize the invention may be embodied in other specific forms without departing from the spirit or essential characteristics thereof. The foregoing embodiments are therefore to be considered in all respects illustrative rather than limiting of the invention described herein. For example, each feature of one embodiment can be mixed and matched with other features shown in other embodiments. Features and processes known to those of ordinary skill may similarly be incorporated as desired. Additionally and obviously, features may be added or subtracted as desired. The scope of the invention is thus indicated by the appended claims, rather than by the foregoing description and all changes that come within the meaning and range of equivalency of the claims are therefore intended to be embraced therein.

What is claimed is:

1. A wave energy converter comprising:
   a) a buoyant nacelle having a central longitudinal axis;
   b) a first spar mated to the nacelle;
   c) a second spar mated to the nacelle;
   d) a first float positioned to rotate about the central longitudinal axis within a radial span bounded by an outer surface of the nacelle and a radially distal end of the first float, wherein the first float is operatively coupled to a first power take off; and
   e) a second float positioned to rotate about the longitudinal axis within a radial span bounded by a radially distal end of the first float and a radially distal end of the second float, wherein the second float is operatively coupled to a second power take off or the first power take off;
   wherein the first float and the second float are free to rotate 360 degrees about the central longitudinal axis.

2. The wave energy converter of claim 1, wherein the first float is operatively coupled to the first power take off and the second float is operatively coupled the second power take off.

3. The wave energy converter of claim 2, wherein the first and second power take offs are each a direct drive generator having a rotor section and a stator section, and wherein the first float is rotatably coupled to the rotor section of the first power take off and the second float is rotatably coupled to the rotor section of the second power take off.

4. The wave energy converter of claim 1, wherein one of the first float or the second float is operatively coupled to a rotor section of the first power take off and the other of the first float or the second float is coupled to a stator section of the first power take off.

5. The wave energy converter of claim 1, further comprising a hydrodynamic control system.

6. The wave energy converter of claim 5, wherein the hydrodynamic control system further comprises at least one of a ballast tank, a plate, a shaped member, a hydrofoil, a fixed weight ballasting feature, or a dynamic ballasting feature.

7. The wave energy converter of claim 5, wherein the hydrodynamic control system attached to at least one of the first spar and the second spar and is movable along a length thereof.

8. The wave energy converter of claim 1, wherein the first float and/or the second float comprises a ballast tank.

9. The wave energy converter of claim 1 wherein the first float, the second float, the first spar, and the second spar are nestable behind the nacelle for transport.

10. The wave energy converter of claim 1 wherein the first spar and the second spar are attached to opposing ends of the nacelle and serve as a structural point of attachment for a hydrodynamic control system.

11. The wave energy converter of claim 1 wherein a rotational orientation of at least one of the first float or second float about the central longitudinal axis is adjustable by at least one of a power take off control, a ballast control, a locking mechanism, a braking mechanism, a ratchet mechanism or any combination thereof.

12. The wave energy converter of claim 1, further comprising a boarding area for maintenance personnel and/or equipment.

13. The wave energy converter of claim 1, further comprising a means for limiting a range of rotational motion of at least one of the first float or the second float about the central longitudinal axis.

14. The wave energy converter of claim 1, wherein at least one of the buoyant nacelle, the first spar, the second spar, the first float, the second float, or a hydrodynamic control system further comprises one or more watertight modules.

15. The wave energy converter of claim 14, wherein the one or more watertight modules are modular, removable, and replaceable.

16. The wave energy converter of claim 1, further comprising a mooring system comprising one or more mooring lines.

17. The wave energy converter of claim 1, further comprising at least one directional vane/rudder connected to at least one of the buoyant nacelle, the first spar, the second spar, the first float, the second float, or a hydrodynamic control system.

18. The wave energy converter of claim 16, wherein the mooring system further comprises a mechanism for providing directional control of the wave energy converter.

19. The wave energy converter of claim 18, wherein the mechanism for providing directional control of the wave energy converter further comprises lengthening or shortening at least one mooring line by at least one of a cable winch or a chain winch.

20. The wave energy converter of claim 18, wherein the mechanism for providing directional control of the wave energy converter further comprises a rotatable interface between the wave energy converter and the mooring system.

21. The wave energy converter of claim 16, wherein the wave energy converter is passively oriented by the mooring system.

22. The wave energy converter of claim 1, wherein the first float and the second float can rotate a full 360 degrees around the central longitudinal axis.

23. A method for generating power comprising the steps of:
   a) providing a wave energy converter comprising:
      i) a buoyant nacelle having a central longitudinal axis;
      ii) a first spar mated to the nacelle;
      iii) a second spar mated to the nacelle;
      iv) a first float positioned to rotate about the central longitudinal axis within a radial span bounded by an outer surface of the nacelle and a radially distal end of the first float, wherein the first float is operatively coupled to a first power take off, and;

v) a second float positioned to rotate about the longitudinal axis within a radial span bounded by a radially distal end of the first float and a radially distal end of the second float, wherein the second float is operatively coupled to a second power take off or the first power take off;

wherein the first float and the second float are free to rotate 360 degrees about the central longitudinal axis;

and b) deploying the wave energy converter in a wave field.

* * * * *